United States Patent [19]

Masutani

[11] Patent Number: 5,251,008
[45] Date of Patent: * Oct. 5, 1993

[54] FOURIER TRANSFORM SPECTROSCOPY AND SPECTROMETER

[75] Inventor: Koji Masutani, Tokyo, Japan

[73] Assignee: JEOL Ltd., Tokyo, Japan

[*] Notice: The portion of the term of this patent subsequent to Jun. 4, 2008 has been disclaimed.

[21] Appl. No.: 818,809

[22] Filed: Jan. 9, 1992

[30] Foreign Application Priority Data

| Jan. 11, 1991 | [JP] | Japan | 3-2278 |
| Mar. 28, 1991 | [JP] | Japan | 3-64623 |
| Mar. 28, 1991 | [JP] | Japan | 3-64624 |
| Mar. 29, 1991 | [JP] | Japan | 3-66704 |

[51] Int. Cl.$^5$ ............................................. G01B 9/02
[52] U.S. Cl. .................................. 356/346; 356/318; 250/339; 250/458.1
[58] Field of Search ............... 356/318, 346; 250/339, 250/458.1

[56] References Cited

U.S. PATENT DOCUMENTS

| 4,925,307 | 5/1990 | Cremers et al. | 356/318 |
| 5,021,661 | 6/1991 | Masutani | 250/339 |

Primary Examiner—Samuel A. Turner
Assistant Examiner—La Charles Keese
Attorney, Agent, or Firm—Webb, Burden, Ziesenheim & Webb

[57] ABSTRACT

A Fourier transform spectrometer for conducting Fourier transform spectroscopy. The spectrometer has a light source emitting light to a sample via a rapid scan interferometer. The transmittance of the sample varies when stimulated. A stimulus generator gives a stimulus to the sample at regular intervals of $\tau$ asynchronously with a reference signal produced for the interferometer. A delay circuit produces a trigger delayed with respect to each stimulation to control a gate circuit. Radiation emanating from the sample is detected by a detector. The output signal from this detector is gated onto a band-pass filter after a given delay $\Delta\tau$ with respect to each stimulation by the gate circuit. The gate circuit produces a digital interferogram. The band-pass filter passes only those frequency components which satisfy the condition:

$$m/2\tau < f < (m+1)/2\tau$$

where m is a positive integer. The analog output signal from the filter is converted into digital form by an A/D converter and fed to a computer, which Fourier-transforms its input signal.

16 Claims, 20 Drawing Sheets

FREQUENCY CHARACTERISTICS OF BAND-PASS FILTER

SPECTRUM EXTRACTED BY BAND-PASS FILTER

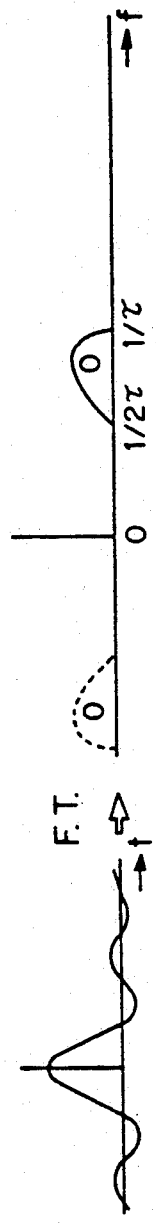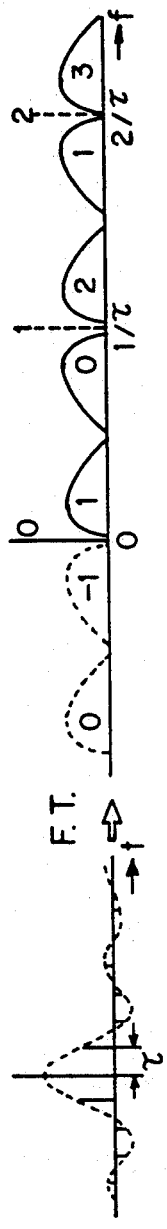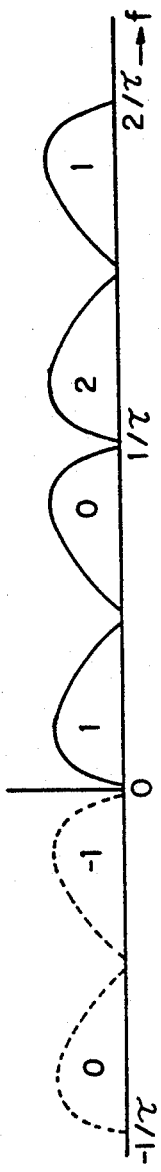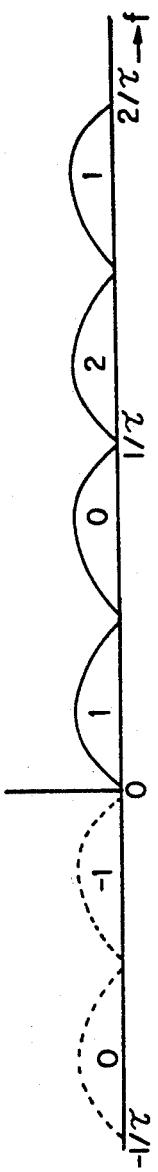
FIG. 2(A) ANALOG INTERFEROGRAM AND ITS SPECTRUM
FIG. 2(B) DIGITAL INTERFEROGRAM AND ITS SPECTRUM
FIG. 17(A)
FIG. 17(B)
FIG. 17(C)

FIG. 3(A) SINGLE STIMULUS
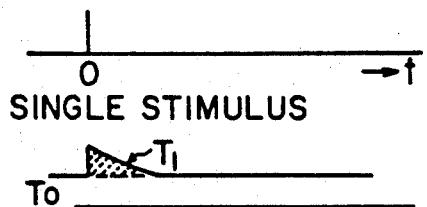
FIG. 3(B) RESPONSE OF SAMPLE
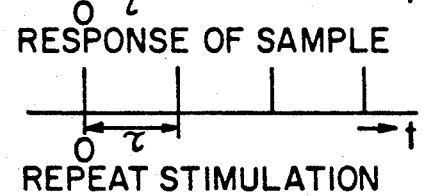
FIG. 3(C) REPEAT STIMULATION
FIG. 3(D) REPONSE OF SAMPLE
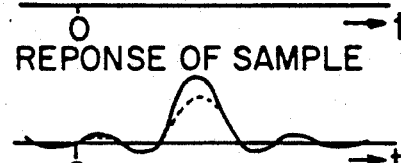
FIG. 3(E) OUTPUT SIGNAL FROM INTERFEROMETER
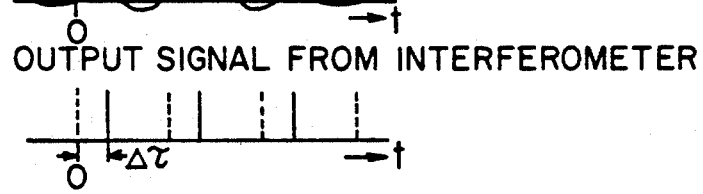
FIG. 3(F) GATING SIGNAL
FIG. 3(G) DIGITAL INTERFEROGRAM
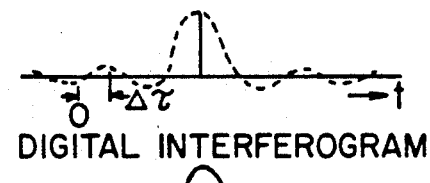
FIG. 3(H) RESTORED ANALOG INTERFEROGRAM
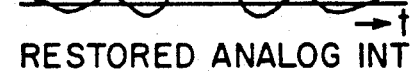
FIG. 3(I) REFERENCE SIGNAL OF INTERFEROMETER
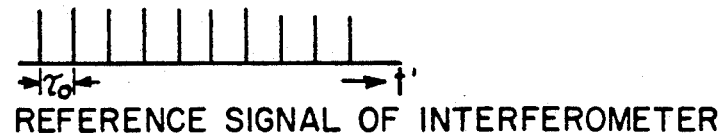

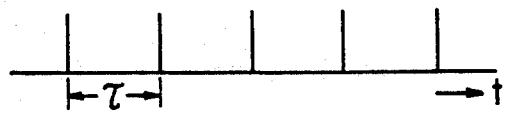
FIG. 12(A)
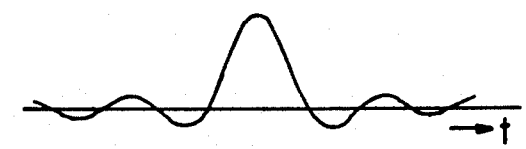
FIG. 12(B) DIGITAL INTERFEROGRAM
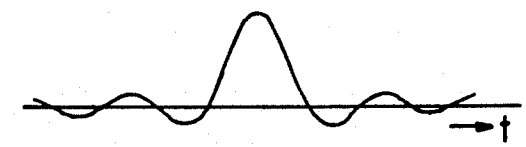
FIG. 12(C) ANALOG INTERFEROGRAM
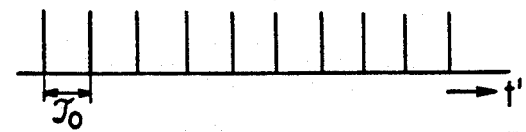
FIG. 12(D) REFERENCE SIGNAL OF INTERFEROGRAM
FIG. 12(E) OUTPUT OF A/D CONVERTER
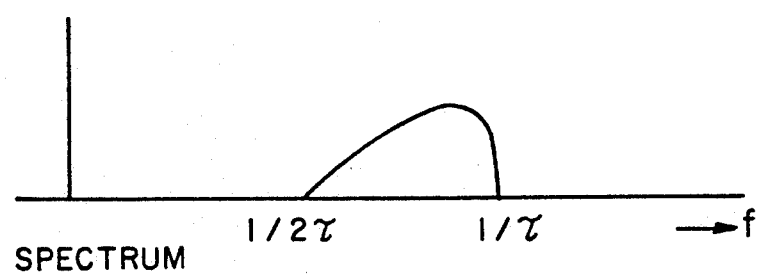
FIG. 15(A) ANALOG INTERFEROGRAM
FIG. 15(B) SPECTRUM

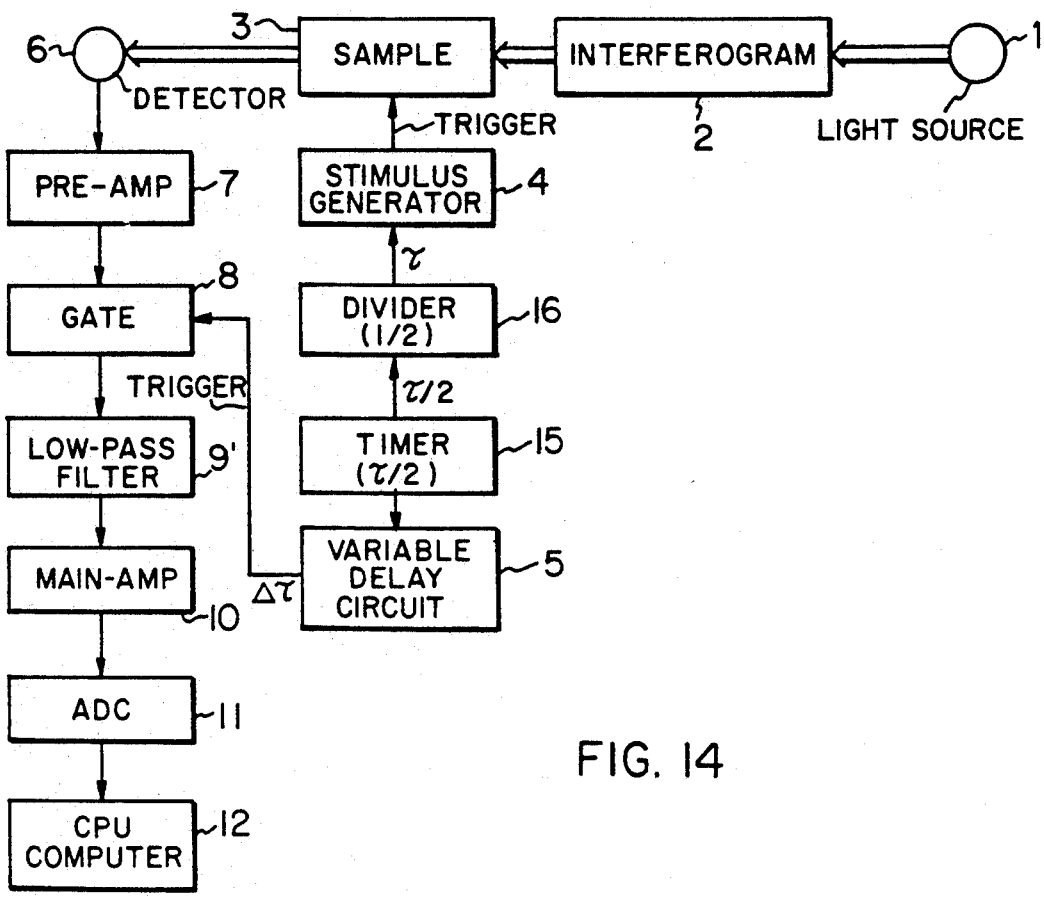
FIG. 14
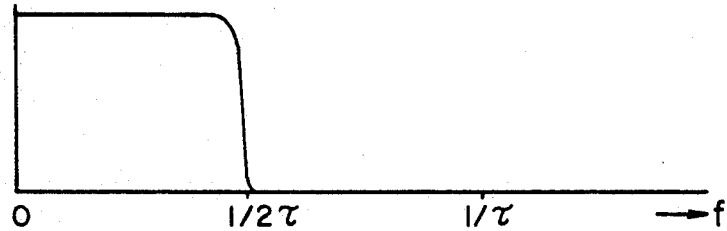
FIG. 18(A) FREQUENCY CHARACTERISTIC OF LOW-PASS FILTER
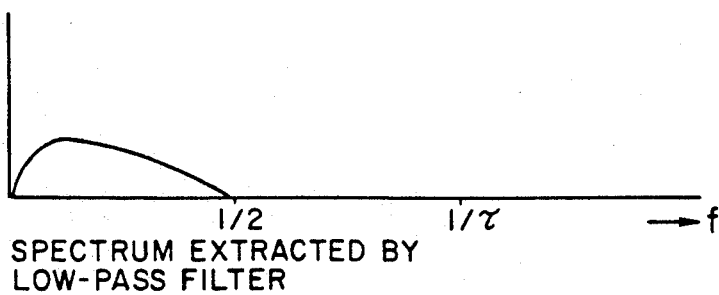
FIG. 18(B) SPECTRUM EXTRACTED BY LOW-PASS FILTER

SINGLE STIMULUS

RESPONSE OF SAMPLE

OUTPUT OF TIMER

REPEAT STIMULATION

RESPONSE OF SAMPLE

OUTPUT OF DELAY CIRCUIT

OUTPUT OF GATE CIRCUIT

OUTPUT OF LOW-PASS FILTER

REFERENCE SIGNAL OF INTERFEROMETER

FOURIER TRANSFORM SPECTROSCOPY AND SPECTROMETER

FIELD OF THE INVENTION

The present invention relates to a Fourier transform spectroscopy for extracting an interferogram, using an interferometer and then Fourier-transforming it to obtain a spectrum of radiation of interest. The invention also relates to an instrument used in such Fourier transform spectroscopy.

BACKGROUND OF THE INVENTION

A sample which is periodically stimulated by electricity, laser radiation, or other means returns to its original state. It has been required in various applications to know the reaction during this returning process. One application resides in the case in which the properties of a liquid crystal are evaluated. For the above-described measurement, time-resolved Fourier transform spectroscopy using a Fourier transform infrared spectrometer is available.

The present applicant has already proposed a time-resolved spectroscopy utilizing Fourier transformation and an instrument used in this spectroscopy. In particular, a stimulus-generating means repeatedly gives a stimulus to a sample at intervals longer than the intervals at which the sample responds. Radiation emerging from the sample is detected by a detector through a rapid scan interferometer. An interferogram is obtained from the output from the detector after a given delay with respect to each stimulus. The interferogram is Fourier-transformed to derive a spectrum. In this way, the reaction of the sample which responds equally to every stimulus is investigated. The output from the detector is sampled after a given delay with respect to the application of each stimulus and passed through a low-pass filter to obtain the envelope of the signal.

The present applicant has also proposed other time-resolved spectroscopy and instrument. Specifically, a pulsed light source is used as the light source. Light is emitted from this light source at the same intervals as the intervals at which a stimulus is given after a given delay with respect to each stimulus. The output from the detector is passed through a low-pass filter to obtain the envelope of the signal. In this manner, an interferogram is produced after a given delay with respect to each stimulus.

In these proposed methods and instruments, each stimulus can be given asynchronously with the reference signal produced for the interferometer. Therefore, the limitations imposed on the stimulus can be reduced greatly. Also, where a fast reaction takes place, the stimulation frequency can be increased, so that the efficiency of measurement can be enhanced. The output signal from the detector is fed to a gate circuit. Similar measurements are performed while controlling either the delay time of the gate circuit or the delay time of the pulsed light source. As a result, a series of spectra can be obtained according to successively varied delay times.

The present applicant has also proposed an instrument consisting of plural measuring systems for one sample, the measuring systems having a common optical system beginning with a light source and ending with a detector. The measuring systems have their respective delay times and are arranged in parallel. Where the sample under investigation responds equally to every stimulus repeatedly applied, the various states of the reacting sample which correspond to different delay times are measured simultaneously.

Furthermore, the present applicant has proposed a further Fourier transform spectroscopy using a pulsed light source and an instrument used in this spectroscopy. Specifically, an interferogram is taken, using an interferometer. The interferogram is Fourier-transformed to obtain a spectrum of a sample, for analyzing it. The pulsed light source emits light at intervals shorter than the sampling interval. The interferogram consisting of low-frequency components is obtained from the output from the detector, sampled, and Fourier-transformed. As a result, a spectrum of the sample which is helpful in analyzing it is derived. These proposed methods are described in U.S. Patent application Ser. Nos. 07/577,636 (now U.S. Pat. No. 5,021,661) and 07/676,576.

These methods proposed by the present applicant assume that the intervals at which the stimulus is given or the emission interval $\tau$ of the pulsed light source is shorter than the sampling interval of the interferogram, i.e., the sampling theorem states that the emission interval of the pulsed light source is shorter than the reciprocal of the square of the maximum frequency $f_{max}$ of the interferogram signal. This reciprocal is equal to or greater than the sampling interval. That is, the proposed methods assume that $\tau < \frac{1}{2}f_{max}$ or $f_{max} < \frac{1}{2}\tau$.

SUMMARY OF THE INVENTION

In view of the foregoing circumstances, it is an object of the present invention to provide a Fourier transform spectroscopy which is based on the methods already proposed by the present applicant as described above and which can be applied to cases where the interval between repeatedly given stimuli or the emission interval of a pulsed light source is longer than the reciprocal of the square of the maximum frequency $f_{max}$ of an interferogram signal, i.e., where a stimulus is repeatedly given at longer intervals of time or the emission interval of a pulsed light source is longer.

It is another object of the invention to provide an instrument for conducting the spectroscopy described in the preceding paragraph.

Let f be the modulation frequency of an interferometer. Let $1/\tau$ be either the repetition frequency at which a stimulus is repeatedly given or the emission frequency of a pulsed light source. The present invention can be applied even to cases where the output signal from a detector lies only within the range given by $m/2\tau < f < (m+1)/2\tau$, where m is a positive integer. Hence, the Fourier transform spectroscopy can also be applied to cases where the intervals at which a stimulus is repeatedly given or the emission interval of a pulsed light source is longer than the reciprocal of the square of the maximum frequency $f_{max}$ of an interferogram signal.

Therefore, time-resolved Fourier transform spectroscopy can be applied to samples which respond to stimuli at longer intervals of time. Additionally, a spectrum representing the state of a sample that is reacting can be obtained, by Fourier-transforming an interferogram consisting of frequencies lower than the modulation frequency produced by an interferometer. Consequently, the arithmetic operations are easier to perform. Further, the inventive method can be easily practiced simply by correcting the phases of the interferogram and converting the wave numbers of the spectrum obtained by Fourier transformation into other wave numbers without modifying the structure of the conventional measuring apparatus.

Also, Fourier transform spectroscopy can be conducted, using a pulsed light source having a longer emission interval. This increases the kinds of light source which can be used as the pulsed light source.

Other objects and features of the invention will appear in the course of the description thereof which follows.

BRIEF DESCRIPTION OF THE DRAWINGS

FIG. 2(A) and FIG. 2(B) are diagrams showing analog and digital interferograms and spectra contained in them;

FIG. 3(A) to FIG. 3(I) are waveform diagrams illustrating the operation of the spectrometer shown in FIG. 1;

FIG. 4(A) to FIG. 4(C) are diagrams showing the frequency-response characteristics of the band-pass filter used in the spectrometer shown in FIG. 1 and its output spectrum;

FIG. 12(A) to FIG. 12(D) are waveform diagrams illustrating the operation of the spectrometer shown in FIG. 11;

FIG. 14 is a block diagram of a further Fourier transform spectrometer according to the invention;

FIG. 15(A) and FIG. 15(B) are diagrams illustrating an analog interferogram and a spectrum contained in it;

FIG. 17(A) to FIG. 17(C) are diagrams illustrating spectra of digital interferograms representing excited state and normal state as well as spectra contained in the output from a gate circuit;

FIG. 18(A) and FIG. 18(B) are diagrams showing the frequency response characteristics of the low-pass filter used in the spectrometer shown in FIG. 14 and its output spectrum;

DETAILED DESCRIPTION OF THE INVENTION

Figure 1:
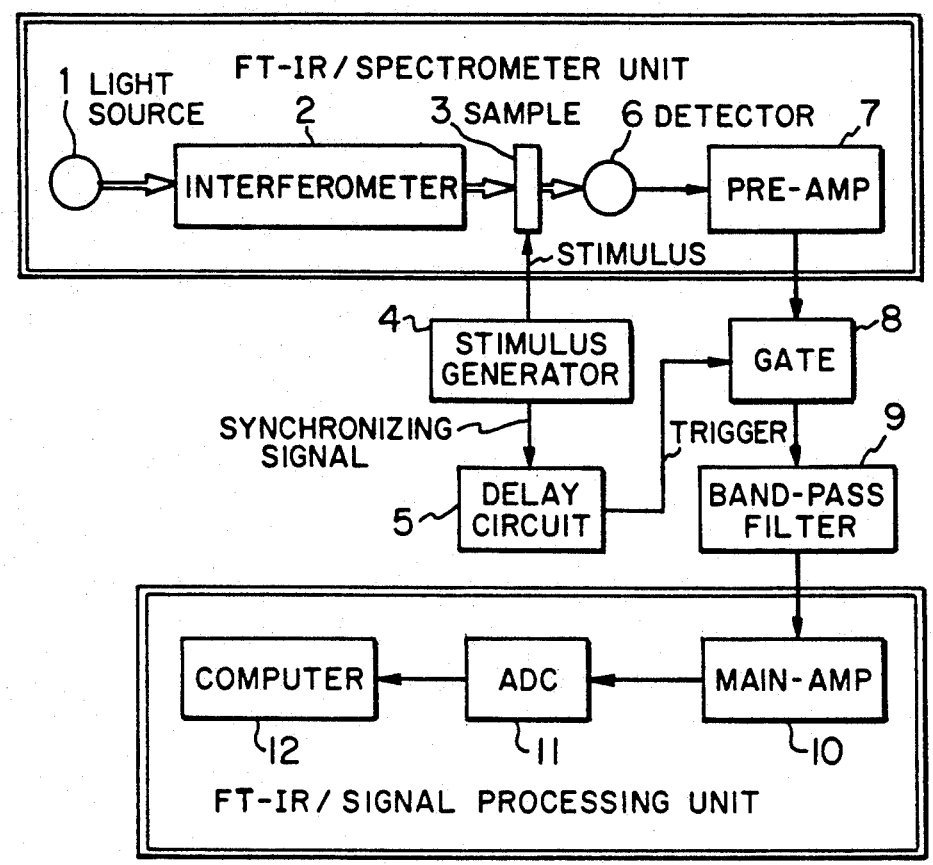
FIG. 1 is a block diagram of a Fourier transform spectrometer according to the invention.

Referring to FIG. 1, there is shown a time-resolved Fourier transform spectrometer embodying the concept of the present invention. This instrument comprises a light source 1, an interferometer 2 located after the light source a stimulus generator 4 giving a stimulus to a sample 3 placed after the interferometer 2, a pulse signal delay circuit 5 disposed behind the stimulus generator 4, a detector 6 located after the sample 3 under investigation so as to detect the radiation emerging from the sample 3, a preamplifier 7 connected with the output of the detector 6, a gate circuit 8 connected with the output of the preamplifier 7, a band-pass filter 9 connected with the output of the gate circuit 8, a main amplifier 10 connected with the output of the filter 9, an analog-to-digital converter 11 connected with the output of the main amplifier 10, and a computer 12 connected with the output of the converter 11. In the present embodiment, the transmittance of the sample 3 varies in response to the applied stimulus. It is also possible that the reflectivity or other factor of the sample 3 varies in response to the stimulus. The output of the delay circuit 5 is connected with the gate circuit 8. The light source 1, the interferometer 2, the detector 6, and the preamplifier 7 together form an FT-IR spectrometer portion. The main amplifier 10, the A/D converter 11, and the computer 12 together constitute an FT-IR signal processing portion.

The stimulus generator 4 produces stimuli or triggers at regular intervals of $\tau$ asynchronously with a reference signal produced for the interferometer 2. This reference signal is a sampling signal used to convert the resulting interferogram into digital form and to supply it into the computer. The delay circuit 5 generates a trigger which is delayed by a constant time $\Delta\tau$ with respect to the synchronizing signal produced by the stimulus generator 4. The output from the preamplifier 7 is gated to the band-pass filter 9 by the gate circuit 8 after the given delay $\Delta\tau$ with respect to each stimulus during a sufficiently short period compared with the interval $\tau$ similarly to the A/D converter 11. As a result, a comb-like interferogram or digital interferogram is obtained. The band-pass filter 9 passes only a certain range of the output spectrum from the gate circuit 8. As described later, this range is given by $m/2\tau < f < (m+1)/2\tau$, where m is a positive integer. In this way, the spectrum is converted into an analog signal, or analog interferogram, having a spectrum produced after the given delay $\Delta\tau$ with respect to the application of each stimulus to the sample 3. The sample 3 investigated by the novel system responds equally to every stimulus repeatedly applied.

The output signal from the preamplifier 7 of the FT-IR spectrometer portion is supplied to the main amplifier 10 of the FT-IR signal processing portion via the gate circuit 8 and the band-pass filter 9. The output signal from this amplifier 10 is sampled by the A/D converter 11 for Fourier transformation. The signal generator 4 produces a signal for stimulating the sample 3 and a pulse signal synchronized to the stimulating signal. This pulse signal is applied as a trigger signal to the gate circuit 8 via the pulse signal delay circuit 5. The sample 3 is set in a sample chamber formed inside the spectrometer portion and repeatedly stimulated by the stimulating signal from the stimulus generator 4 at intervals of $\tau$. Generally, this interval $\tau$ between the successive stimuli is longer than the duration of period $\tau'$ between the instant, at which a transient phenomenon of the sample 3 is started by one stimulus and the instant at which the phenomenon attenuates completely. Where the transient phenomenon begins simultaneously with the stimulus, it is necessary that the duration of the stimulus be shorter than the unit time in which the transient phenomenon is measured. Let $f_{min}$ and $f_{max}$ be the minimum and the maximum, respectively, of the frequency f, or the frequency of the interferogram, at which a spectrum representing the transient phenomenon is modulated by the interferometer during each unit time of measurement. The sample is repeatedly stimulated at intervals of $\tau$ which satisfies the conditions:

$$\tau > m/2f_{min} \quad (a)$$

$$\tau < (m+1)/2f_{max} \quad (b)$$

where m is a positive integer. That is, the spectrum obtained from the sample 3 lies only in the range given by $$m/2\tau < f < (m+1)/2\tau.$$

FIG. 2(A) shows the analog interferogram and its spectrum when m=1. Letting $\sigma$ ($=1/\lambda$, where $\lambda$ is the wavelength) be the wave number of the spectrum and $v$ be the speed at which the moving mirror of the interferometer 2 moves, the modulation frequency f is given by $2v\sigma (f=2v\sigma)$. Thus, the above-described conditions can be met by limiting the band, or the wavelength range, of the spectrum emitted from the light source 1 by means of an optical filter or by adjusting the speed of the moving mirror. As can be seen from the aforementioned conditions, one feature of this spectroscopy is that the repetition frequency $1/\tau$ is not required to be synchronized with the movement of the mirror.

The principle on which light is dispersed by the instrument of this construction is next described. When stimulated, the sample 3 is excited with a certain probability. At the same time, it begins to be attenuated toward its original state (FIG. 3(B)). At this time, the sample 3 absorbs those wave numbers of light which show characteristic bands corresponding to the molecular structure in the transient state. The transmittance spectrum reflecting the transient state of the sample 3 which has been stimulated with a single stimulus (FIG. 3(A)) can be given by $$T(\sigma, t) = T_0(\sigma) + T_1(\sigma, t) \quad (1)$$

Where the sample is repeatedly stimulated as shown in FIG. 3(C), the spectrum is expressed by $$T(\sigma, t) = T_0(\sigma) + T_1(\sigma, t) * III\tau(t) \quad (2)$$

as shown in FIG. 3(D). In equation (2) above, $T_0(\sigma)$ is a transmittance spectrum independent of the stimulus, $T_1(\sigma, t)$ is a transmittance spectrum varying in response to the stimulus, $III\sigma(t)$ is a comb function consisting of dirac delta functions $\delta$ equispaced at intervals of $\tau$ and representing a repeated operation, and * expresses a convolution. At this time, the output signal F(x,t) from the detector 6 is given by $$F(x, t) = \int T(\sigma, t) B(\sigma) \cos 2\pi X\sigma d\sigma = F_0(x) = \int \{T_1(\sigma, t) * III\tau(t)\} B(\sigma) \cos 2\pi X\sigma d\sigma \quad (3)$$

$$F_0(x) = \int T_0(\sigma) B(\sigma) \cos 2\pi x\sigma d\sigma \quad (3')$$

where Fo(x) is the output from the interferometer and represents spectral components independent of the stimulus; t is time for which the sample is stimulated; x is the optical path difference in the interferometer 2; $\sigma$ is the wave number of the spectrum; and $B(\sigma)$ is a background spectrum obtained when the sample 3 has been removed from the sample chamber in the FT-IR spectrometer portion. The solid line in FIG. 3(E) diagrammatically shows the waveform of the output signal from the interferometer. The relation of the optical path difference x to a time variable x' is given by $x=2vt'$. However, t and t' are not correlated with each other in phase, because the excitation of the sample 3 is not synchronized with the movement of the moving mirror of the interferometer 2. Specifically, the phase difference $\Delta t = t' - t$ between t and t' becomes different whenever the moving mirror is scanned. Therefore, the second term of equation (3) indicates that the interferogram assumes a different value whenever the moving mirror is scanned.

The output from the detector 6 is supplied to the gate circuit 8 and gated onto the band-pass filter 9 in response to the gate signal which is delayed by $\Delta\tau$ with respect to the stimulating signal from the stimulus generator 4. The timing is shown in FIG. 3(F). The duration of the gate signal is set shorter than the unit time of measurement. For simplicity, the duration of the gate signal is made infinitesimal, and the sampling processing is given by $III\tau(t)$. At this time, the output signal F'(x, t) from the gate circuit 8 is given by $$F(x, t) = III\tau(t - \Delta\tau) [F_0(x) + \int\{T_1(\sigma, t)*III\tau(t)\}B(\sigma)\cos 2\pi x\sigma d\sigma] \quad (4a)$$

$$= III\tau(t - \Delta\tau) \int \{T(\sigma, \Delta\tau) B(\sigma) \cos 2\pi x\sigma d\sigma \quad (4b)$$

This signal is shown in FIG. 3(G). The manner in which equation (4b) is derived from equation (4a) will be described later. The integral portion of equation 4(b) represents the interferogram (analog interferogram) of the spectrum $T(\sigma, \Delta\tau)B(\sigma)$ obtained from the sample 3 that is in transient state after time $\Delta\tau$ passes since the sample 3 has been stimulated. The whole of equation (4b) takes the form of discrete data, i.e., digital interferogram, obtained by sampling this analog signal with $III\tau(t-\Delta\tau)$. That is, equation (4b) means that the signal derived by a measurement is time-resolved with this delay time. Since the variables t and x are asynchronous with each other, the sampling position on the interferogram differs whenever the moving mirror is scanned.

In order to get further knowledge of the output from the gate circuit 8, the term $III\tau(t-\Delta\tau)$ of equation (4b) is Fourier-transformed with respect to time t' which is correlated with the movement of the moving mirror. Then, the spectrum carried by the signal is investigated. Thus, we have $$\int III\tau(t - \Delta\tau) \exp(-2\pi ft') \, dt' = (1/\tau) \exp\{-i2\pi(\Delta\tau + \Delta t)f\} III1/\tau(f) \quad (5)$$
$$= (1/\tau) [\delta(f) + \exp\{-i2\pi(\Delta\tau + \Delta t)/\tau\} \delta(f - 1/\tau) + \ldots + \quad (5')$$
$$\exp\{i2\pi(\Delta\tau + \Delta t)/\tau\} \delta(f + 1/\tau) + \ldots ]$$

Equation (5) is a comb function having phase terms. The spectrum which is obtained by Fourier-transforming the integral portion of equation (4b) with respect to time is $T(f, \Delta\tau)B(f)$ where the modulation frequency f is a variable, excluding the coefficients. Therefore, the whole equation (4b), which is the output signal from the gate circuit 8, indicates that spectra obtained from $\exp\{-i2\tau(\Delta\tau+\Delta t)/\tau\}\delta(f-1/\tau)$ which is the (+1)st order term of equation (5') and from other terms appear as analog sideband signals other than the spectrum $T(f \Delta\tau)B(f)$ that should be obtained. This term $T(f,\Delta\tau)B(f)$ is derived from (f) which is the zeroth order term of equation (5'). The sideband signals have carrier frequencies given by $n/\tau$, where n is an integer. Since the condition $m/2\tau < f < (m+1)/2]$ exists, the spectra of the sideband signals are not superimposed on each other. This can be seen from FIG. 2(B). The numerals given to the spectra in this figure indicate sidebands of the carrier frequencies of like numerals.

Figure 4A:
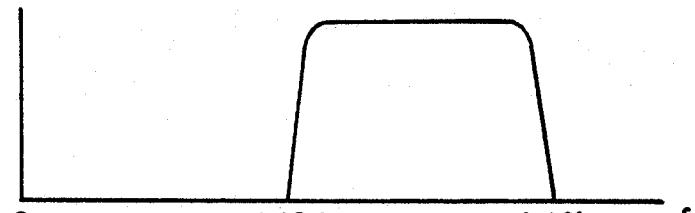
Figure 4B:
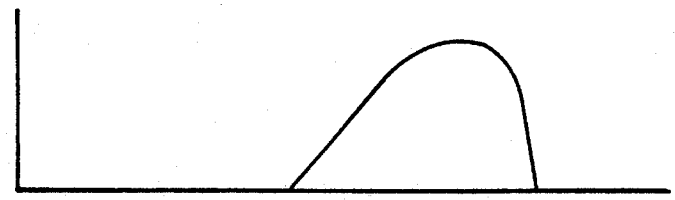

In accordance with the present invention, the output signal from the gate circuit 8 is passed through the band-pass filter 9 having characteristics shown in FIG. 4(A) to extract only the spectrum bearing numeral 1 (FIG. 4(B)). At this time, the filter 9 produces an analog signal, or an analog interferogram, having a spectral component to which the first term (zeroth term) of equation (5') contributes. Since the first term of equation (5') has no phase components, the output signal does not bring about phase shift and is given by $$F(x, \Delta\tau) = (1/\tau) \int \{T(\sigma, \Delta\tau) B(\sigma) \cos 2\pi x\sigma d\sigma \quad (6)$$

Equation (6) expresses an interferogram in analog form, the interferogram reflecting the transient state of the sample 3 after a lapse of time $\Delta\tau$ since the sample has been stimulated. Equation (6) is independent of time t. That is, the discrete signal (as shown in FIG. 3(G)) which is passed through the gate circuit 8 is restored to analog form as shown in FIG. 3(H) by the band-pass filter 9. Since this takes the same form as interferograms obtained by normal Fourier transform infrared spectroscopy, a spectrum $T(\sigma,t)B(\sigma)$ is obtained in the same way as in conventional Fourier transform infrared spectroscopy. In particular, the interferogram is sampled by the A/D converter 11, using the reference signal (FIG. 3(I)) produced at intervals of $\tau_o$ for the interferometer. The resulting signal is Fourier-transformed by the computer 12. At this time, the interval $\tau_o$ is required to fulfill the conditions:

$$\tau_o > m/2f_{min} \text{ and } \tau_o < (m+1)/2f_{max}$$

where $f_{min}$ and $f_{max}$ are the minimum and the maximum, respectively, of the modulation frequency of the interferogram signal produced from the band-pass filter 9; and m is 0 or a positive integer. For example, a transmittance spectrum $T(\sigma, \Delta\tau)$ reflecting the transient state of the sample 3 after the lapse of time $\Delta\tau$ since the sample 3 has been stimulated can be obtained by taking the ratio of the spectrum $T(\sigma, \Delta\tau)B(\sigma)$ derived by the novel method to $B(\sigma)$ obtained by conventional Fourier transform infrared spectroscopy. Similarly, spectra can be derived with various delay times by adjusting the delay time of the pulse signal delay circuit 5 so as to vary the delay time $\Delta\tau$ introduced in the trigger signal applied to the gate circuit 8.

As described thus far, in the novel Fourier transform spectroscopy, transient phenomena of a sample can be measured provided that the interval between successively given stimuli is longer than the reciprocal of the square of the maximum frequency $f_{max}$ of the interferogram signal and that the transient phenomena repeat themselves asynchronously with the sampling.

The manner in which equation (4b) is obtained from equation (4a) is now described. The above-described equation (4a) assumes the form: $F,(x, t)$ $$= III\tau(t-\Delta\tau)[Fo(x) + \int \{T_1(\sigma, t)*III\tau(t)\}B(\sigma)\cos 2\pi x\sigma d\sigma] \quad (4a)$$

Since the term $III\tau(t-\Delta\tau)$ included in equation (4a) and indicating sampling processing is a function independent of the variable $\sigma$, the term can be included in the second integral term. Now we extract only $III\tau(t-\Delta\tau)T_1(\sigma, t)*III\tau(t)\}$ that depends on the time variable t. Then, this term is modified. Since a comb function can be given by a sum of delta functions, we have $$III\tau(t) = \Sigma\delta(t-n\tau) \quad (A1)$$

We rewrite $III\tau(t-\Delta\tau) T_1(\sigma, t)*III\tau(t)\}$, using this equation (A1), where n is an integer.

$$III\tau(t - \Delta\tau)\{T_1(\sigma, t) * III\tau(t)\} = \{\Sigma\delta(t - \Delta\tau - n\tau)\}[\int T_1(\sigma, t - t')\}\Sigma\delta(t' - m\tau)\}dt'] \quad (A2)$$
$$= \{\Sigma\delta(t - \Delta\tau - n\tau)\} \{\Sigma T_1(\sigma, t - m\tau)\}$$

where m is also an integer. Since the interval $\tau$ between the successive stimuli is set longer than the lifetime $\tau'$ of the transient phenomenon of the sample, the relation $T_1(\sigma, t) = 0$ holds if $t < 0$ or $t \geq \tau$. Therefore, equation (A2) means that a signal is obtained only when $n = m$. Accordingly, equation (A2) can be modified as follows:

$$\{\Sigma\delta(t - \Delta\tau - n\tau)\}\{\Sigma T_1(\sigma, t - m\tau)\} = \Sigma\{\delta(t - \Delta\tau - n\tau)T_1(\sigma, t - n\tau)\} \quad (A3)$$
$$= \Sigma\{\delta(t - \Delta\tau - n\tau)T_1(\sigma, \Delta\tau)\}$$

Since $T_1(\sigma, \Delta\tau)$ is a constant, it can be taken out of the braces. Thus, $$\Sigma\{\delta(t - \Delta\tau - n\tau)T_1(\sigma, \Delta\tau)\} = T_1(\sigma, \Delta\tau)\Sigma\{\delta(t - \Delta\tau - n\tau)\} \quad (A4)$$
$$= T_1(\sigma, \Delta\tau)III\tau(t - \Delta\tau)$$

As a result, $$T(\sigma, t) = T_0(\sigma) + T_1(\sigma, t)$$

Using equation (1), $F_r(x, t)$ of equation (4a) can be changed into the desired form given by $$F(x, t) = III\tau(t - \Delta\tau) \int T(\sigma\Delta\tau) B(\sigma) \cos 2\pi x\sigma d\sigma \quad (4b)$$

Figure 5:
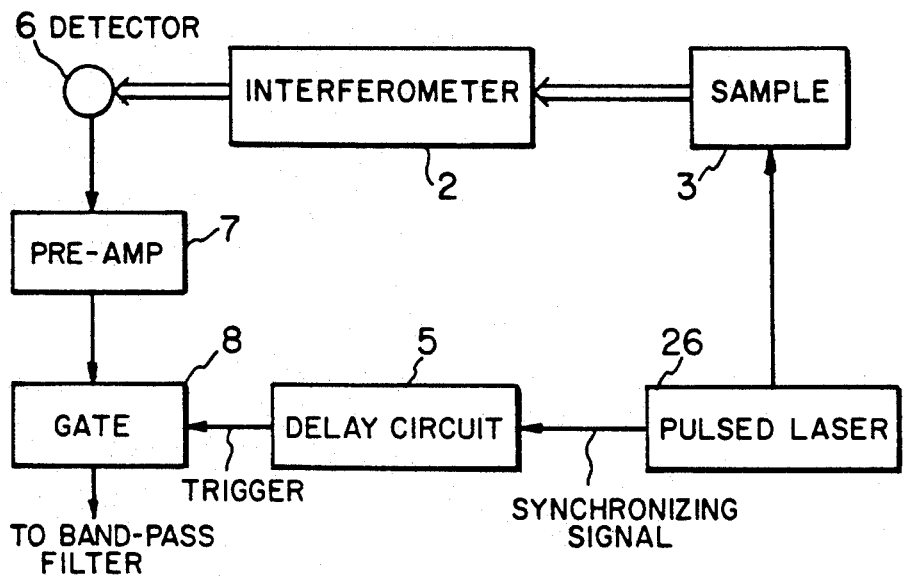
FIG. 5 is a block diagram of main portions of a fluorescence spectrophotometer according to the invention.

It is to be noted that the present invention is not limited to the embodiment illustrated in FIG. 1; rather, various changes and modifications are possible. For example, the function of the gate circuit may be replaced by turning on and off the detector voltage in synchronism with the trigger signal from the stimulus generator. Furthermore, the invention can be similarly applied to fluorescence spectrophotometry and Raman spectroscopy in which radiation from a pulsed laser is directed to a sample. Referring to FIG. 5, the present invention is applied to fluorescence analysis. A pulsed laser 26 is employed as a stimulus generator. A sample 3 which is irradiated with pulsed radiation from the pulsed laser 26 fluoresces after the pulsed radiation ceases. The emitted fluorescent light is introduced into an interferometer 2. Therefore, it might be said that the sample 3 is a light source. Signals are processed in the same manner as in the embodiment described in connection with FIG. 1.

Figure 6:
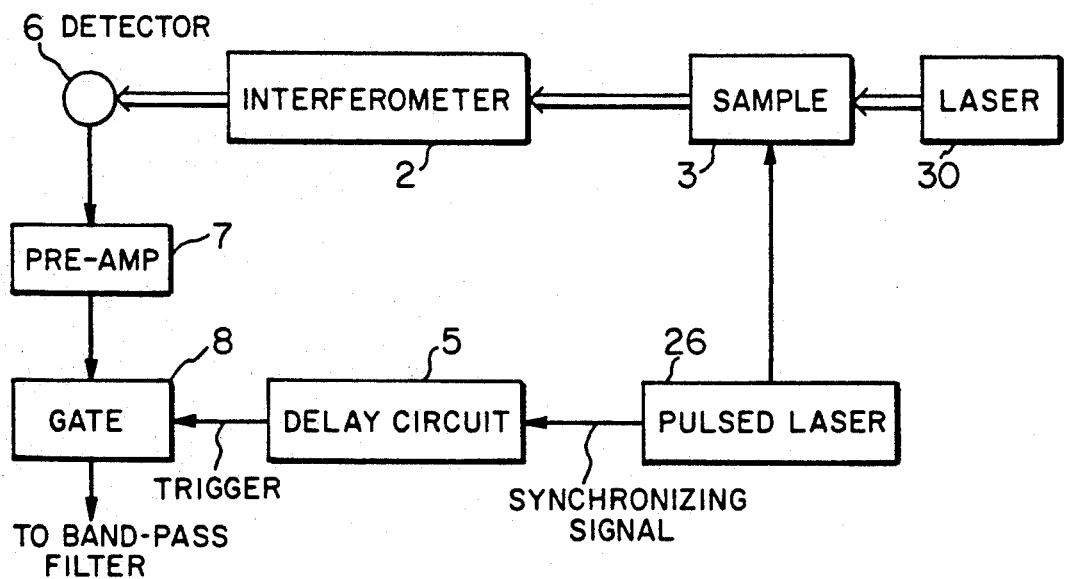
FIG. 6 is a block diagram of main portions of a Raman spectrometer according to the invention.

Referring next to FIG. 6, the present invention is applied to Raman spectroscopy. Radiation from a laser 30 oscillating continuously excites a sample 3. Under this condition, the sample $\Delta\tau$ is irradiated with pulsed radiation from a pulsed laser 26 to stimulate the sample. Light emitted from the sample is guided via an interferometer 32 to a detector 33, where the resulting Raman scattering is detected. Signals are processed in the same manner as in the embodiment described already in conjunction with FIG. 1.

In the instruments shown in FIGS. 1, 5, and 6, the delay circuit, the gate circuit, the band-pass filter, and other components together form one channel. It is also possible to provide a plurality of such channels. These channels are connected in parallel. The output signal from the common detector is supplied to every channel. The delay $\Delta\tau$ between the instant at which the sample is started to be stimulated and the instant at which every gate circuit is opened is made different from channel to channel. Thus, interferograms to which different delay times with respect to the application of each stimulus are introduced are obtained simultaneously. The interferograms are Fourier-transformed to give rise to spectra reflecting different phases of a reaction process of the sample that reacts equally to every stimulus. This series of spectra is obtained by one measurement.

Figure 7:
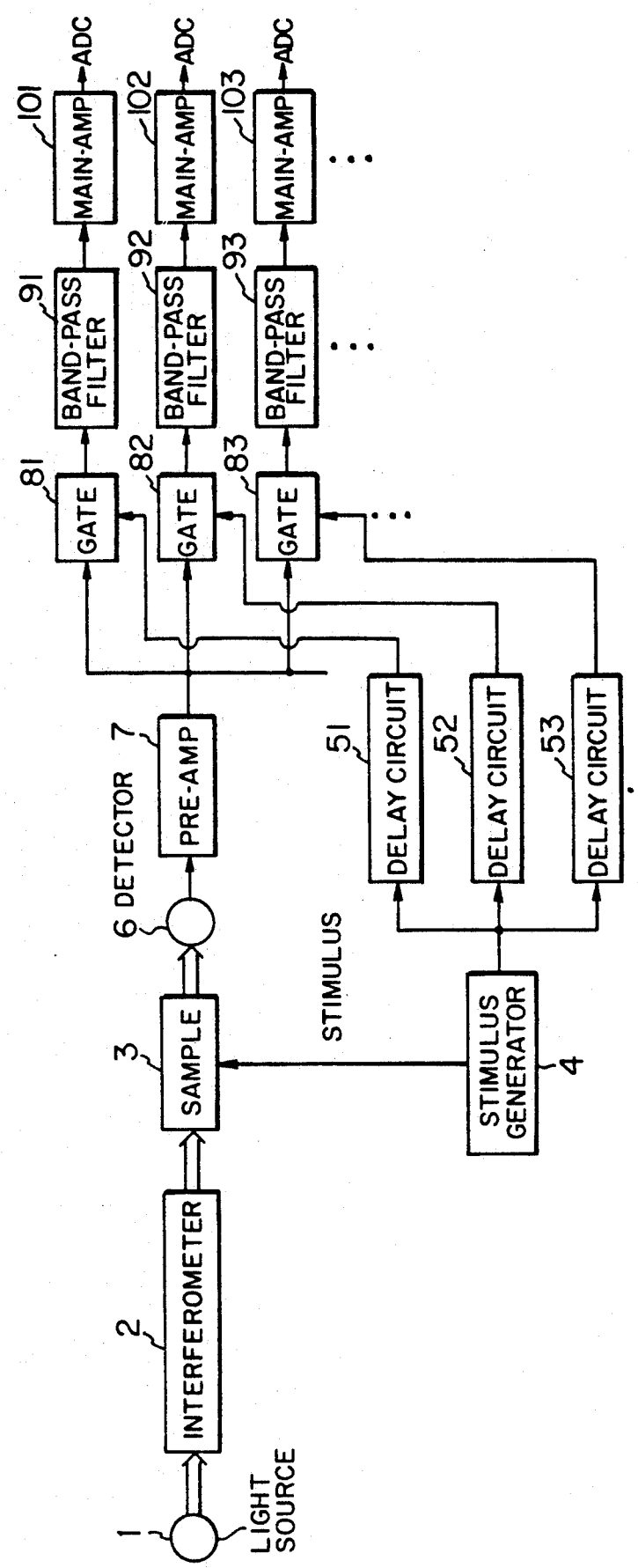
FIG. 7 is a block diagram of a Fourier transform spectrometer having multiple channels, the spectrometer being built in accordance with the invention.

Referring next to FIG. 7, there is shown an instrument carrying out such Fourier transform spectroscopy. A stimulus generator 4 repeatedly produces impulsive stimuli at intervals of $\tau$ as shown in FIG. 3(C). A sample 3 is stimulated with these stimuli and emits light. The light emanating from the sample 3 is detected by a detector 6, which then produces a corresponding output signal. This instrument is similar to the instruments shown in FIGS. 1, 5, and 6 up to this stage. The output signal from the detector 6 is supplied to a plurality of gate circuits 81, 82, 83, etc. arranged in parallel. The stimulus generator 4 produces a synchronizing signal to delay circuits 51, 52, 53, etc. arranged in parallel. The delay circuits 51, 52, 53, etc. have different delay times $\Delta\tau1, \Delta\tau2, \Delta\tau3$, etc., and send trigger signals to the gate circuits 81, 82, 83, etc., respectively, after delay times $\Delta\tau1, \Delta\tau2, \Delta\tau3$, etc., respectively, since each stimulus has been produced. Therefore, the gate circuits 81, 82, 83, etc. produce comb-like interferograms which are sampled in such a way that $\Delta\tau$ of FIG. 3(F) is replaced by $\Delta\tau1, \Delta\tau2, \Delta\tau3$, etc. These are comb-like interferograms obtained by applying the detector output signal to the gate circuits only with delay times $\Delta\tau1, \Delta\tau2, \Delta\tau3$, etc. with respect to the application of each stimulus. The harmonics of the comb-like interferograms excluding the zeroth order terms are filtered out by band-pass filters 91, 92, 93, etc. connected with the gate circuits 81, 82, 83, etc., respectively. The result is that the comb-like interferograms are converted into analog interferograms as shown in FIG. 3(H). Each analog interferogram is sampled at intervals of $\tau_0$ of the reference signal for the interferometer by an analog-to-digital converter installed in each channel and converted into digital form. The digital signals are accepted into a computer 12 and Fourier-transformed in the same way as in the embodiment illustrated i FIG. 1. Consequently, spectra representing the states of the sample 3 at the instants determined by the delay times $\Delta\tau1, \Delta\tau2, \Delta\tau3$, etc. are obtained by one measurement. The time taken to make one measurement can be shortened as compared with the time taken for the instruments shown in FIGS. 1, 5, and 6.

In the above embodiments, the light source emits light continuously to investigate transient states of the sample after delay time $\Delta\tau$ elapses since the sample has been stimulated. The detector outputs taken with these delay times are shaped into comb-like forms by the gate circuits. As a result, digital interferograms are obtained. The novel method can also exploit a pulsed light source as the light source. This pulsed light source is made to emit light at the same intervals as the interval between the stimuli with delay $\Delta\tau$ with respect to each stimulation. In this structure, the gate circuits are omitted.

Figure 8:
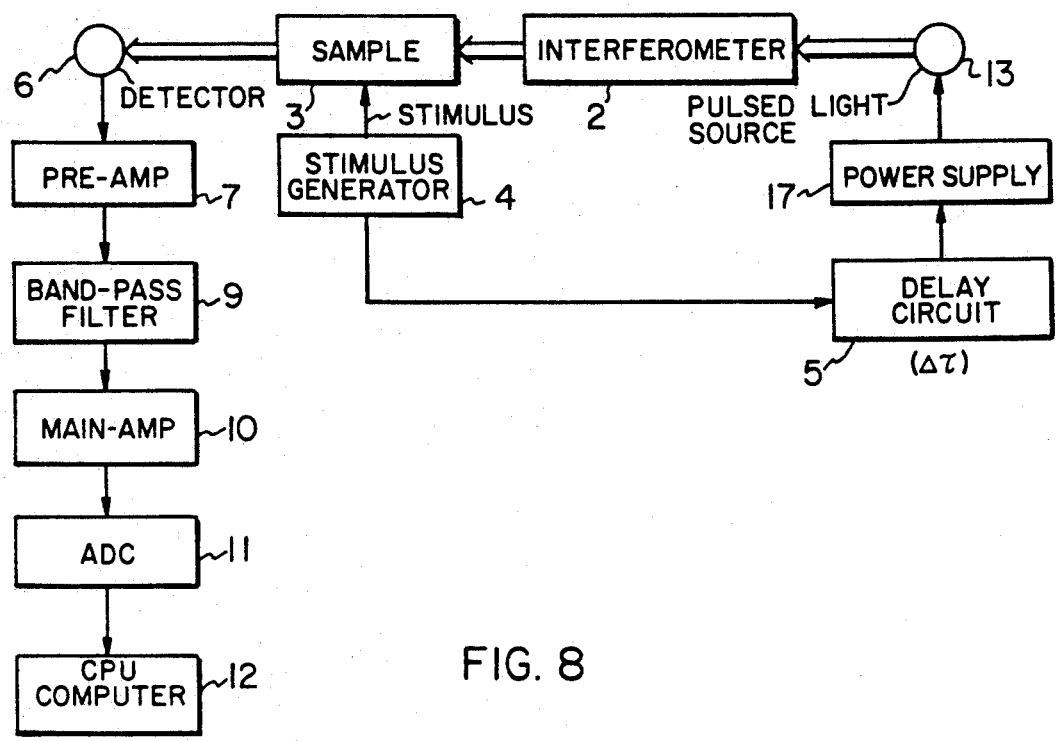
FIG. 8 is a block diagram of a fundamental Fourier transform spectrometer using a pulsed light source according to the invention.

FIG. 8 shows an instrument of this structure. This instrument is similar to the instrument shown in FIG. 1 except that a pulsed light source 13 is used as the light source for the interferometer without using gate circuits and that the trigger signal from the delay circuit 5 is supplied to a power supply 17 for the pulsed light source 13 so that the light source 13 may be lit up at intervals by the trigger signal. In the present embodiment, the pulsed light source 13 is lit up impulsively after a delay of $\Delta\tau$ since the sample 3 has been stimulated. The detector 6 produces the same output signal as the output signal (FIG. 3(G)) from the gate circuit shown in FIG. 1.

Figure 9:
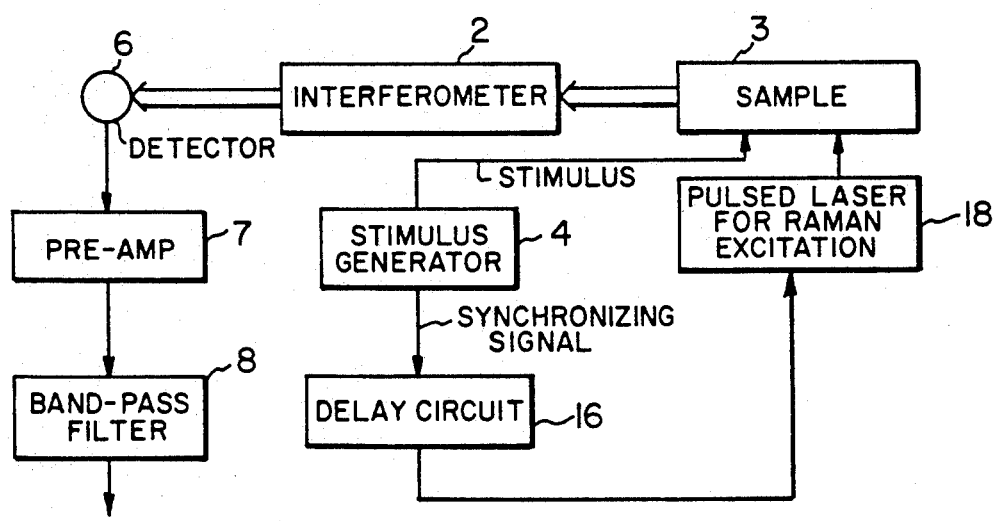
FIG. 9 is a block diagram of another Raman spectrometer according to the invention.

In this embodiment, a pulsed light source is provided. The sample is stimulated. Pulsed radiation is emitted after a given delay. Instead of using such a pulsed light source, the sample may be stimulated by a pulsed laser 18 for Raman excitation as shown in FIG. 9. In particular, where this method is applied to a time-resolved Fourier transform Raman spectrometer, the pulsed laser 18 is used instead of the light source power supply 17 shown in FIG. 8. A stimulus generator 4 gives stimuli to the sample at intervals of $\tau$. A delay circuit 5 produces a trigger signal to the pulsed laser 18 after a given delay $\Delta\tau$ with respect to the synchronizing signal. The laser 18 then emits laser radiation causing Raman scattering.

Also in this case, i.e., where a pulsed light source is used, plural channels including band-pass filters may be arranged in parallel. The output signal from the common detector is applied to every channel. The delay time $\Delta\tau$ between the instant at which a stimulus is given to the sample and the instant at which the pulsed light source is excited is made different among the channels. Spectra reflecting different states of the sample which responds equally to every stimulus can be obtained at the same time. One example of this structure is shown in FIG. 10.

Figure 10:
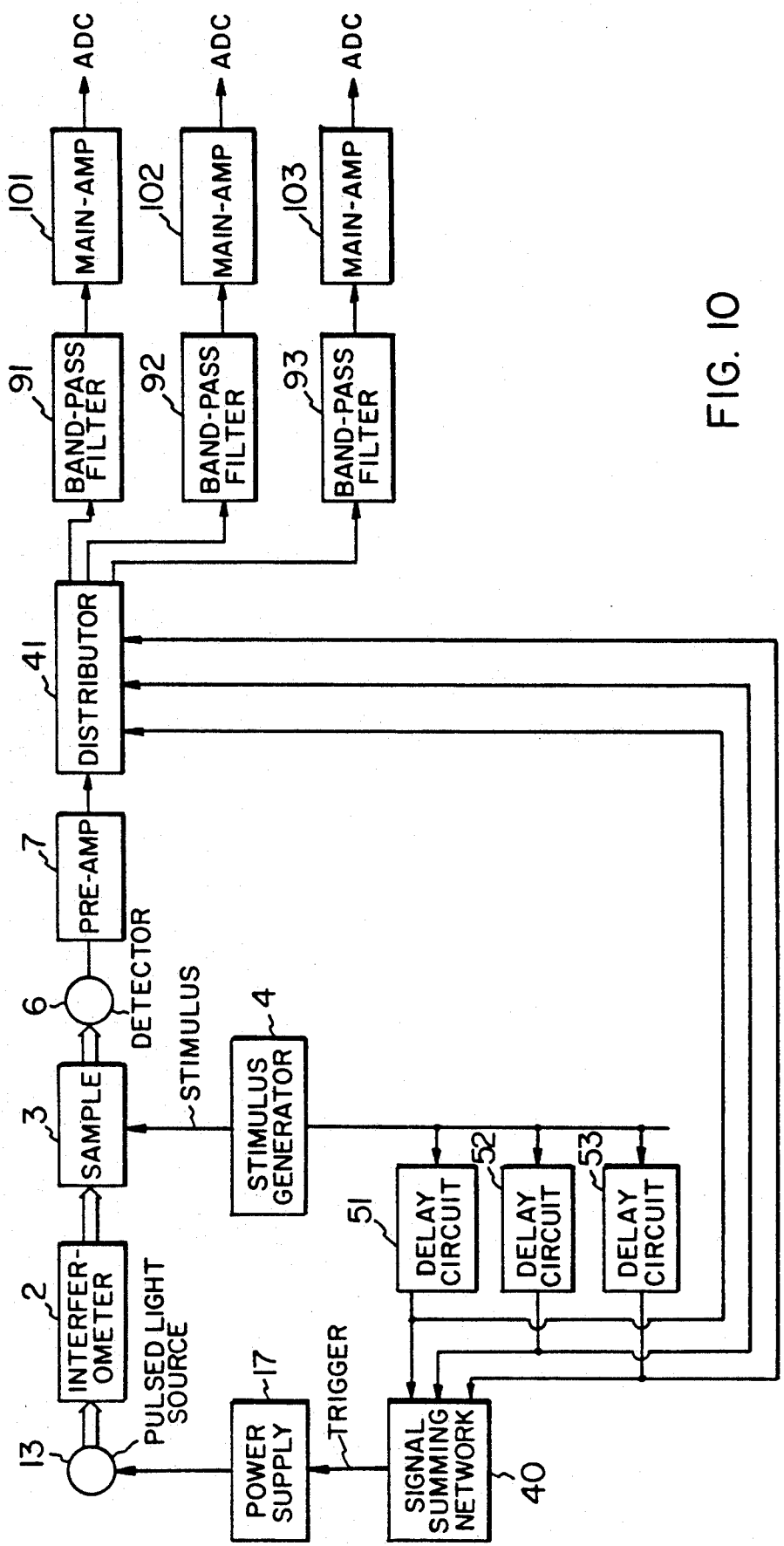
FIG. 10 is a block diagram of another Fourier transform spectrometer having multiple channels, the spectrometer being built in accordance with the invention.

Referring to FIG. 10, a stimulus generator 4 produces a synchronizing signal to plural delay circuits 51, 52, 53, etc., arranged in parallel. These delay circuits generate trigger signals with delay times $\Delta\tau 1$, $\Delta\tau 2$, $\Delta\tau 3$, etc., respectively, with respect to the generation of each stimulus. A trigger signal summing network 40 produces the sum of the trigger signals from the delay circuits 51, 52, 53, etc. The output signal from the network 40 triggers a power supply 17 for the light source with delay times $\Delta\tau 1$, $\Delta\tau 2$, $\Delta\tau 3$, etc. with respect to the stimulation of the sample 3. The light source 1 emits light at intervals. Therefore, it substantially follows that the detector output signal is sampled only with delay times $\Delta\tau 1$, $\Delta\tau 2$, $\Delta\tau 3$, etc., with respect to each stimulation. In this way, comb-like interferograms are obtained. The comb-like signals are distributed among next stages of band-pass filters 91, 92, 93, etc. by a distributor 41 according to the delay times $\Delta\tau 1$, $\Delta\tau 2$, $\Delta\tau 3$, etc. with respect to each stimulation. Subsequently, in the same way as in the embodiment illustrated in FIG. 7, spectra representing the states of the sample 3 assumed after delay times $\Delta\tau 1$, $\Delta\tau 2$, $\Delta\tau 3$, etc. are obtained concurrently. For this reason, the time required for the measurement can also be shortened as compared with the times required by methods illustrated in FIGS. 8 and 9.

As described thus far, the present invention is applicable to cases where the output signal from the detector caters for the condition:

$$m/2\tau < f < (m+1)/2\tau \text{ (m is a positive integer)}$$

where f is the modulation frequency of the interferometer, and $1/\tau$ is the frequency at which a stimulus is repeated or the frequency of the emission of the pulsed light source. In consequence, time-resolved Fourier transform spectroscopy can be applied to samples which respond at so long intervals that the spectroscopy have been heretofore impossible to apply.

Figure 11:
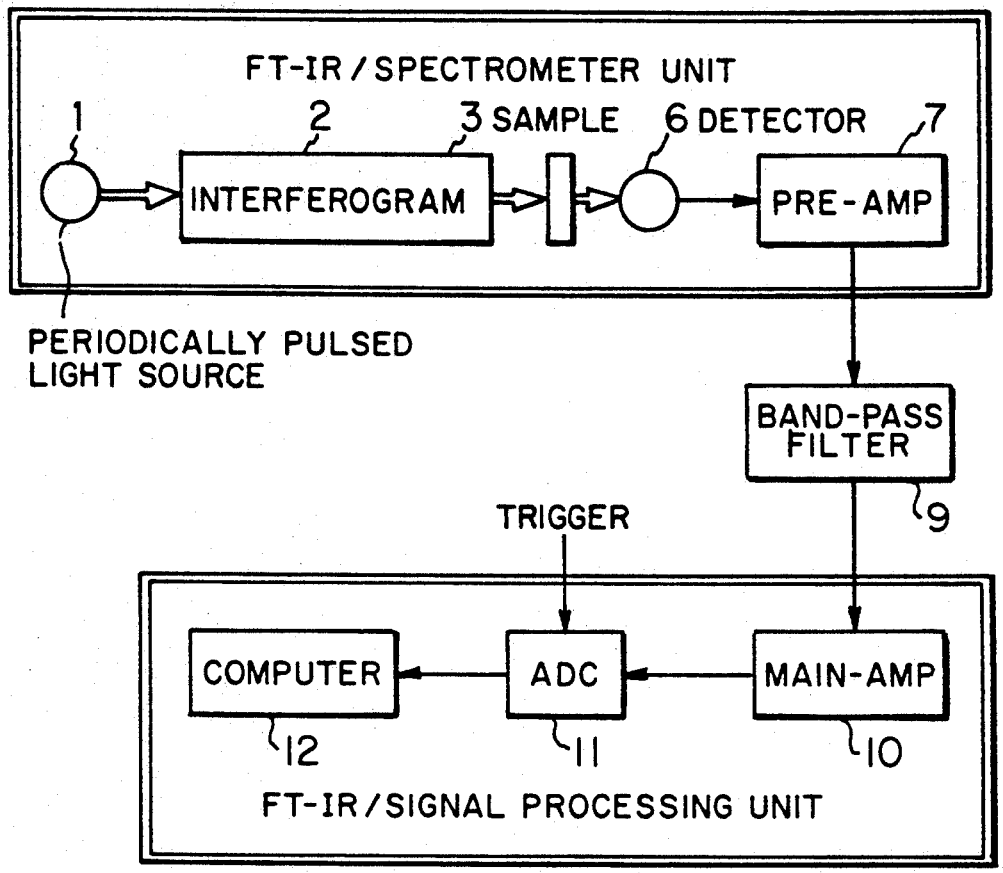
FIG. 11 is a further Fourier transform spectrometer according to the invention.

Referring to FIG. 11, there is shown another Fourier transform spectrometer carrying out another embodiment of the novel Fourier transform spectroscopy. This instrument is similar to the instrument shown in FIG. 1 except that a periodically pulsed light source 1' is used as a light source and that the stimulus generator 4, the pulse signal delay circuit 5, and the gate circuit 8 are omitted. The light source 1' emits constant-intensity pulsed light at regular intervals of $\tau$ asynchronously with the trigger signal applied to the A/D converter 11. This trigger signal is a sampling signal used to convert interferograms into digital form and to supply the resulting digital signals into the computer, where the data is Fourier-transformed. Instead of this periodically pulsed light source, a synchrotron orbital radiation source or a sample which exhibits Raman effect when excited with pulsed laser radiation may be used. If the intensity of the light source fluctuates, the intensity may be monitored, and the detector output may be normalized. The band-pass filter 9 acts to pass only a certain band of the analog interferogram produced from the preamplifier 7, the band being given by $$m/2\tau < f < (m+1)/2\tau \text{ (m is a positive integer)}$$

as described later. The A/D converter samples the analog interferogram from the filter 9 in response to the trigger signal produced at intervals of $\tau 0$.

Let $f_{min}$ and $f_{max}$ be the minimum and the maximum, respectively, of the frequency f, or the frequency of the interferogram, at which a spectrum of measured light is modulated by the interferometer 2. The pulsed light source 1' emits light at intervals of $\tau$ which satisfies the above-described conditions:

$$\tau > m/2f_{min} \text{ and } \tau < (m+1)/2f_{max}$$

where m is a positive integer. That is, the spectrum of the measured light lies only in the range given by $$m/2\tau < f < (m+1)/2\tau$$

FIG. 2(A) shows the spectrum when m=1. The modulation frequency f is given by $f=2\nu\sigma$, where $\sigma$ is the wave number of the spectrum $(=1/\lambda$, where $\lambda$ is wavelength), and $\nu$ is the speed at which the moving mirror 2 moves. Thus, the above-described condition can be met by limiting the band, or the wave number range, of the spectrum emitted from the light source 1' by means of an optical filter or by adjusting the speed of the moving mirror. As can be seen from the aforementioned condition, one feature of this spectroscopy is that the repetition frequency $1/\tau$ of the light source 1' is not required to be synchronized with the movement of the mirror.

The principle on which light is dispersed by the instrument of this construction is next described. As shown in FIG. 12(A), the light source 1' emits light periodically. The light is given by a comb function III$\tau$(t) which represents a repeated operation and in which dirac delta functions $\delta(t)$ are spaced from each other regularly at intervals of time $\tau$. Let $T(\sigma)$ be a transmittance spectrum of the sample 3. The output signal F(x, t) from the detector 6 is given by $$F(x, t) = III\tau(t) \int T(\sigma) B(\sigma) \cos 2\pi x\sigma d\sigma \quad (11)$$

where x is the optical path difference in the interferometer 2, $\sigma$ is the wave number of the spectrum, and $B(\sigma)$ is a background spectrum obtained when the sample 3 has been removed from the sample chamber in the FT-IR spectrometer portion. The solid line in FIG.

12(B) diagrammatically shows the waveform of the output signal from the interferometer. Although the relation of the optical path difference x to the time variable t' is given by x=2νt', emission of the light source 1' is not synchronized with the movement of the moving mirror of the interferometer 2. Therefore, t and t' are not correlated with each other in phase. That is, the phase difference $\Delta t = t' - t$ between t and t' assumes a different value each time the moving mirror is scanned. As such, equation (11) means that the interferogram takes a different value whenever the moving mirror is scanned.

The integral portion of equation (11) represents the interferogram (analog interferogram) of the spectrum $T(\sigma)B(\sigma)$ obtained from the sample. The whole of equation (11) takes the form of discrete data, i.e., digital interferogram, obtained by sampling this analog signal with $III\tau(t)$. Since the variables t and x are asynchronous with each other, the sampling position on the interferogram differs whenever the moving mirror is scanned.

In order to get further knowledge of the output from the detector 6, the term $III\tau(t)$ of equation (11) is Fourier-transformed with respect to time t' which is correlated with the movement of the moving mirror. Then, the spectrum of the signal is investigated. Thus, we have $$\int III\tau(t)exp(-2\pi ft')dt' = (1/\tau)exp(-i2\pi(\Delta t f))III1/\tau(f) \quad (12)$$

$$= (1/\tau)\{\delta(f) + exp\{-i2\pi\Delta t/\tau\}\delta(f-1/\tau) + + exp-(i2\pi\Delta t/\tau)\delta(f+1/\tau) + \} \quad (12')$$

Equation (12) is a comb function having phase terms. The spectrum which is obtained by Fourier-transforming the integral portion of equation (11) with respect to time is $T(f)B(f)$, where f is the modulation frequency, excluding the coefficients. Therefore, if the phase terms and the coefficients are not taken into account, the whole equation (11) produced from the detector 6 indicates that the spectrum $T(f)B(f)$ under measurement appears and that a similar spectrum appears as a sideband of the carrier frequency. They are spaced from each other by $1/\tau$. $T(f)B(f)$ is derived from $\delta(f)$ which is the zeroth order term of equation (12'). Since this takes the form of an odd function, the same spectrum appears on the opposite side of the axis f=0, i.e., in the negative domain. Since the condition $$m/2\tau < f < (m+1)/2\tau$$

exists, the spectra of the sideband signals are not superimposed imposed on each other. This can be seen from FIG. 2(B). The numerals given to the spectra in this figure indicate sidebands of the carrier frequencies of like numerals.

The output signal from the detector 6 is passed through the band-pass filter 9 having characteristics shown in FIG. 4(A) to extract only the spectrum bearing numeral 0. At this time, the filter 9 produces an analog signal, or an analog interferogram (FIG. 12(C)), having a spectral component to which the first term (zeroth term) of equation (12') contributes. Since the second term of equation (12') has no phase components, the output signal does not bring about phase shift and is given by $$F(x) = (1/\tau)\int\{T(\sigma)B(\sigma) \cos 2\pi x\sigma d\sigma \quad (13)$$

F(x) of equation (13) represents an interferogram in analog form and is independent of time t. Specifically, discrete interferograms (FIG. 12(B)) obtained in response to pulsed emission of the light source 1' are restored to the continuous analog interferogram shown in FIG. 12(C) by the band-pass filter 9. Since this restored interferogram signal takes the same form as interferograms obtained by a normal Fourier transform infrared spectrometer, the interferogram signal is sampled with a reference signal (FIG. 12(D)) produced at interval of $\tau_0$ for the interferometer 2, by the A/D converter 11. Then, the resulting samples are Fourier-transformed by the computer 12, in the same way as in the processing performed by the conventional Fourier transform infrared spectrometer. As a result, a spectrum $T(\sigma)B(\sigma)$ is derived. At this time, the interval $\tau_0$ is required to satisfy the conditions:

$$\tau_0 > m'/2f_{min} \text{ and } \tau_0 < (m'+1)/2f_{max}$$

where $f_{min}$ and $f_{max}$ are the minimum and the maximum, respectively, of the modulation frequency of the interferogram signal produced from the band-pass filter 9, and m' is zero or a positive integer. A transmittance spectrum $T(\sigma)$ of the sample 3 is obtained by taking the ratio of the spectrum $T(\sigma)B(\sigma)$ derived as described above to a background spectrum $B(\sigma)$ obtained by a similar measurement in which the sample is removed.

As described thus far, in the novel Fourier transform spectroscopy, spectroscopic measurements can be made, using a pulsed light source whose emission interval is longer than the reciprocal of the square of the maximum frequency $f_{max}$ of the interferogram signal. That is, spectroscopic measurements can be performed, using a pulsed light source emitting light at longer intervals of time.

Figure 13:
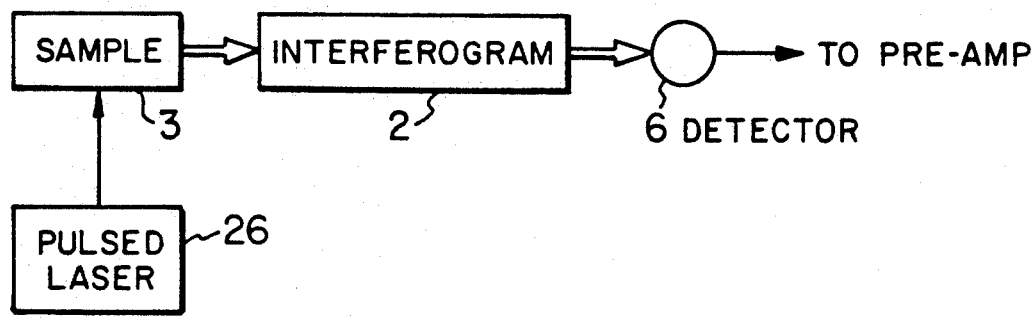
FIG. 13 is a block diagram of main portions of yet another Raman spectrometer according to the invention.

Referring next to FIG. 13, there is shown an apparatus conducting Raman spectroscopy to which the novel Fourier transform spectroscopy is applied. A pulsed laser 26 emits light at intervals of $\tau$ to excite a sample 3. Radiation from the sample 3 which has undergone Raman scattering is directed via an interferometer 2 to a detector 6, where the radiation is detected. The output signal from the detector 6 is sent to an analog-to-digital converter 11 via a preamplifier 7, a band-pass filter 9, and a main amplifier 10, in the same way as in the instrument shown in FIG. 11, to sample the signal. Let $f_{min}$ and $f_{max}$ be the minimum and the maximum, respectively, of the frequency at which the Raman-scattered light from the sample 3 is modulated by the interferometer 2. Let $\tau$ be the emission interval of an exciting pulsed laser 26. The emission is repeated if the conditions $$\tau > m/2f_{min} \text{ and } \tau < (m+1)/2f_{max} \text{ (m is a positive integer)}$$

are met. This means that the spectrum of the measured, Raman-scattered light lies only within the range given by $$m/2\tau < f < (m+1)/2\tau$$

As can be understood from the description made thus far, Fourier transform spectroscopy can be applied to cases where a pulsed light source is used and the detector output signal satisfies the conditions:

$$m/2\tau < f < (m+1)/2\tau \text{ (m is a positive integer)}$$

where f is the modulation frequency of the interferometer, and $1/\tau$ is the frequency of the pulsed light source. Hence, spectroscopic measurements can be made, using a pulsed light source whose emission interval is longer than the reciprocal of square of the maximum frequency $f_{max}$ of the interferogram signal. That is, spectroscopic measurements can be performed, using a pulsed light source emitting light at longer intervals of time. Therefore, a synchrotron orbital radiation source or a sample which exhibits Raman effect when excited with pulsed laser radiation can also be employed. In this manner, the usable light sources are increased in number.

Furthermore, the time for which the sample is illuminated with light can be shortened. Also, the quantity of the illuminating light can be reduced. Consequently, Fourier transform spectroscopy can be applied to even those samples which are adversely affected by illumination of light or continuous illumination of light. Hence, the spectroscopy can find wider application.

FIG. 14 shows the fundamental structure of an instrument utilizing the novel Fourier transform spectroscopy to which the concept of differential measurement is applied. This instrument is similar to the instrument shown in FIG. 1 except that a low-pass filter 9' is used as a filter and that the clock pulses from the timer 15 are sent to the stimulus generator 4 via a frequency divider 16 in which the frequency of the output signal is half of the input frequency. However, depending on the selected value of m, a band-pass filter may be used.

Figure 16A:
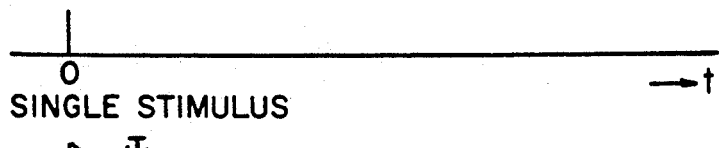
FIG. 16(A) to FIG. 16(I) are waveform diagrams illustrating the operation of the spectrometer shown in FIG. 14.
Figure 16B:
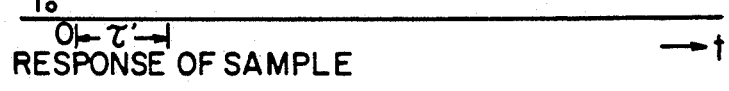
Figure 16C:
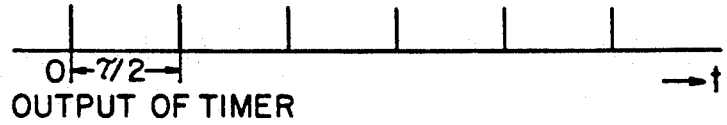
Figure 16D:
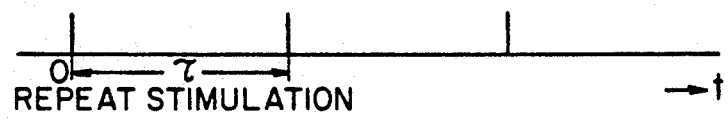
Figure 16E:
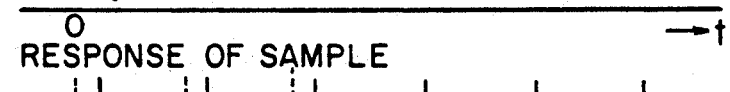
Figure 16F:
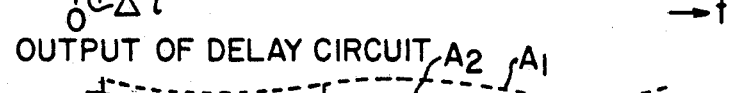
Figure 16G:
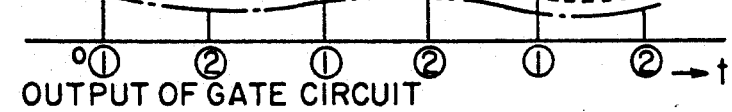
Figure 16H:

Referring particularly to FIG. 14, the sample 3 responds equally to every stimulus at intervals of time $\tau'$. The timer 15 produces clock pulses (FIG. 16(C)) at intervals of $\tau/2$ ($\leq$the interval $\tau'$ between successive reactions). The clock pulses from the timer 15 are sent to the stimulus generator 4 via the ½-frequency divider 16 as a trigger signal (FIG. 16(D)) produced at intervals of $\tau/2$. The stimulus generator 4 applies stimuli to the sample 3 at intervals of $\tau$ in response to the trigger signal. The clock pulses from the timer 15 are also sent to a variable delay circuit 5, which produces triggers (FIG. 16(F)) to the gate circuit 8, the triggers being delayed by a given time $\Delta\tau$ with respect to the clock pulses from the timer 7. The gate circuit 8 is opened during the period of each trigger signal. This period is sufficiently shorter than the interval $\tau/2$ similarly to the A/D converter 11. As shown in FIG. 16(G), the gate circuit passes its input signal while the trigger is present. A low-pass filter 9' passes only low-frequency components (f $<\frac{1}{2}\tau$) of the output signal from the gate circuit 8. As a result, an analog signal is produced which represents the difference spectrum between the transmittance of the sample 3 assumed after a delay of $\Delta\tau$ since the sample 3 has been stimulated and the transmittance assumed in normal condition.

The sample 3 is set in a sample chamber formed inside the Fourier transform infrared spectrometer portion and repeatedly stimulated by the stimulating signal from the stimulus generator 4 at intervals of $\tau$. The response of the sample to each stimulus is shown in FIG. 16(E). Generally, the interval $\tau$ between the stimuli is at least twice as long as the reaction period $\tau'$ between the instant at which a transient phenomenon of the sample 3 is started by each stimulus and the instant at which the phenomenon attenuates completely. Where the transient phenomenon begins simultaneously with the stimulus, it is necessary that the duration of the stimulus be shorter than the unit time in which the transient phenomenon is measured. Let $f_{min}$ and $f_{max}$ be the minimum and the maximum, respectively, of the frequency at which a spectrum is modulated by the interferometer during each unit time in normal state of the sample 3 and also in transient state. The sample is repeatedly stimulated at intervals of $\tau$ which satisfies the conditions:

$$\tau > m/2f_{min}$$

$$\tau < (m+1)/2f_{max}$$

These operations are exactly the same as the operations performed in the previous embodiments. FIG. 15 shows an analog interferogram taken with delay $\Delta\tau$ with respect to the stimulation when m=1 and a spectrum obtained by Fourier-transforming this interferogram. Similar interferogram and spectrum are obtained under normal conditions.

The principle on which light is dispersed by the instrument of this construction is next described. Equations (1), (3) and (3') described above apply exactly to the present embodiment similarly to the embodiments described thus far.

The output signal from the detector 6 is supplied to the gate circuit 8 and allowed to pass through the gate circuit 8 in response to a gate signal delayed by $\Delta\tau$ with respect to the clock pulses produced by the variable delay circuit 5. The timing is illustrated in FIG. 16(F). The duration of the gate signal is set shorter than the unit time of measurement. For simplicity, the duration is made infinitesimal. The sampling processing is divided into III$\tau$(t) and III$\tau$(t−$\tau$/2) which are separately displayed. The former represents sampling when the sample 3 is excited. The latter represents sampling in normal state. The output signal A1=F'$_1$ (x, t) (the passed portion of the interferogram indicated by the broken line in FIG. 16(G)) from the gate circuit 8 with delay time $\Delta\tau$ in excited state is given by $$F_1(x, t) = III\tau(t - \Delta\tau) [Fo(x) + \quad (4a')$$
$$\int T_1(\sigma, t) * III\tau(t)\}B(\sigma)\cos 2\pi x\sigma d\sigma]$$
$$= III\tau(t - \Delta\tau)\int T(\sigma, t)B(\sigma)\cos 2\pi x\sigma d\sigma \quad (4b')$$

The output signal A2=F'$_2$ (x, t) from the gate circuit 8 in normal state is given by $$F_2(x, t) = III\tau(t - \tau/2 - \Delta\tau)Fo(x) \quad (15)$$

This output signal is the passed portion of interferogram indicated by the dot-and-dash line in FIG. 16(G). The integral portion of equation (4b') represents the interferogram (analog interferogram) of the spectrum $T(\sigma, \Delta\tau)B(\sigma)$ obtained from the sample 3 that is in transient state after time $\Delta\tau$ passes since the sample 3 has been stimulated. The whole of equation (4b') takes the form of discrete data, i.e., digital interferogram, obtained by sampling this analog signal with III$\tau$(t−$\Delta\tau$). That is, equation (4b) means that the signal derived by a measurement is time-resolved with this delay time $\Delta\tau$.

Similarly, Fo(x) of equation (15) represents the interferogram (analog interferogram) of the spectrum To($\sigma$,)B($\sigma$) obtained from the sample 3 that is in normal state. The whole of equation (15) takes the form of discrete data, i.e., digital interferogram, obtained by sampling this analog signal with III$\tau$(t−$\tau$/2−$\Delta\tau$). In particular, equation (15) indicates that the signal obtained by a measurement is time-resolved with delay time $\tau/2+\Delta\tau$. Equations (4b') and (15) indicate that whenever the moving mirror is scanned, the sampling position on the interferogram differs, since the variables t and x are not synchronous with each other.

In order to get further knowledge of the output from the gate circuit 8, the term $III\tau(t-\Delta\tau)$ of equation (4b') and the term $III\tau(t-\tau/2-\Delta\tau)$ equation (15) are Fourier-transformed with respect to time t' which is correlated with the movement of the moving mirror. Then, the spectrum of the signal is investigated. Thus, we have $$\begin{aligned}
\int III\tau(t - \Delta\tau)\exp(-2\pi ft')dt' &= (1/\tau)\exp\{-i2\pi(\Delta\tau + \Delta t)f\}III1/\tau(f) & (16) \\
&= (1/\tau)[\delta(f) + \exp\{-i2\pi(\Delta\tau + \Delta t)/\tau\}\delta(f - 1/\tau) + \ldots + & (16') \\
&\quad \exp\{i2\pi(\Delta\tau + \Delta t)/\tau\}\delta(f + 1/\tau) + \ldots ] \int III\tau(t - \tau/2 - \Delta\tau)\exp(-2\pi ft')dt' \\
&= (1/\tau)\exp\{-i2\pi(\tau/2 + \Delta\tau + \Delta t)f\}III1/\tau(f) & (17) \\
&= (1/\tau)[\delta(f) + \exp\{-i2\pi(\tau/2 + \Delta\tau + \Delta t)/\tau\}\delta(f - 1/\tau) + \ldots + & (17') \\
&\quad \exp\{i2\pi(\tau/2 + \Delta\tau + \Delta t)/\tau\}\delta(f + 1/\tau) + \ldots ]
\end{aligned}$$

Equations (16) and (17) are comb functions having phase terms. That is, equations (4b') and (15) indicate that Fourier transformation gives rise to spectra having sidebands of frequency $1/\tau$ with phases $2\pi(\Delta\tau+\Delta\tau)/\tau$. It can be seen that their spectra concerning odd-numbered terms, or two terms of equations (16') and (17'), are 180° out of phase. More specifically, of the output spectrum from the gate circuit 8 shown in FIG. 16(G), the first term represents the difference spectrum between excited state and normal state. The spectra of the sidebands are not superimposed because of the condition $m/2\tau < f < (m+1)/2\tau$. This is described in further detail by referring to FIG. 17 under the condition m=1. FIG. 17(A) shows a spectrum of a digital interferogram (A1 of FIG. 16(G)) in excited state. FIG. 17(B) shows a spectrum of a digital interferogram (A2 of FIG. 16(G)) in normal state. FIG. 17(C) shows the output spectrum from the gate circuit 8. The numerals given to the spectra in these figures indicate sidebands of the carrier frequencies of like numerals.

The output signal from the gate circuit 8 is passed through the low-pass filter 9' having the characteristics shown in FIG. 18(A). As a result, an analog signal (FIG. 18(B)), or a differential analog interferogram, having only the spectral component which bears numeral 1 in FIG. 17(C) and is associated with two terms of equations (16') and (17') is obtained. This signal is produced by modulating the interferogram given by $\int T_1(\sigma, \Delta\tau)B(\sigma)\cos 2\pi x\sigma d\sigma$ at frequency $1/\tau$. In the embodiment of FIG. 17, it is also possible to pass only odd-numbered spectra by the use of a band-pass filter. Generally, spectra regarding the odd order terms of equations (16') and (17') are extracted, using a filter which passes spectra given by $n/2\tau < f < (n+1)/2\tau$, where n is zero or a positive integer given by $n = m + 2k$ or $n = -(m+1) + 2k$, and k is an odd number.

Figure 16I:
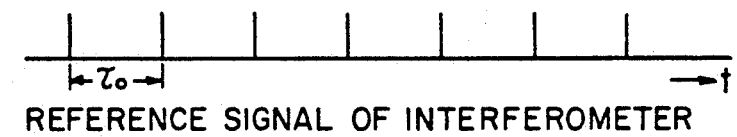

Since this signal contains the phase of a function of $\Delta t$, the analog signal takes a different shape whenever the moving mirror of the interferometer is scanned. Therefore, data obtained by measurements is not accumulated until every item of data is phase compensated. In particular, the phase is restored to the analog signal produced from the low-pass filter 9' and so interferograms are sampled with a reference signal (FIG. 16(I)) produced at intervals of $\tau_0$ for the interferometer 2 for the Fourier transformation performed by the A/D converter 11. Then, they are phase compensated by the CPU 12, after which the interferograms are directly accumulated. Subsequently, they are Fourier-transformed. Alternatively, the interferograms are Fourier-transformed simultaneously with phase compensation and converted into spectra. Then, they are accumulated. Let $f_{min}$ and $f_{max}$ be the minimum and the maximum, respectively, of the modulation frequency of the differential spectrum produced from the low-pass filter 9, It is necessary that the interval $\tau_0$ satisfy the conditions:

$$\tau_0 > m'/2f_{min} \text{ and } \tau_0 < (m'+1)/2f_{max}$$

where m, is zero or a positive integer.

Thus, where m=1, a differential spectrum given by $$T_1\{\tfrac{1}{2}\nu\tau\}-\sigma, \Delta\tau\}B\{1/(2\nu\tau)-\nu\}$$

is obtained. Therefore, as an example, the ratio of this spectrum to a background spectrum $B\{1/(2\nu\tau)-\sigma\}$ obtained separately by conventional Fourier transform infrared spectroscopy is taken. Then, the differential spectrum $T_1\{1/(2\nu\tau)-\sigma, \Delta\tau\}$ between the transmittance spectrum $T\{1/(2\nu\tau)-\sigma, \Delta\tau\}$ representing the transient state after delay $\Delta\tau$ since the sample 3 has been stimulated and the transmittance spectrum $T_0\{1/(2\nu\tau)-\sigma, \Delta\tau\}$ obtained under normal condition can be derived. Then, the delay time of the variable delay circuit 5 is adjusted in the same manner to vary the delay time $\Delta\tau$ of the trigger signal to the gate circuit 8. As a result, a series of spectra is obtained with successively varied delay times. In the above method, the wave numbers of the spectra obtained as described above are folded back or shifted. Therefore, it is necessary to restore the wave numbers by the CPU 12, i.e., the wave numbers must be converted into other wave numbers.

As described above, the novel Fourier transform spectroscopy permits the spectrum between a spectrum representing a transient state and a spectrum representing normal state of a sample to be obtained provided that the interval between the successive stimuli is longer than the reciprocal of the square of the maximum frequency $f_{max}$ and that the stimulus is repeatedly given to the sample asynchronously with the sampling. Hence, the spectroscopy can be applied to samples responding to stimuli at long intervals of $\tau'$. In this way, interferograms are processed in the form of a differential spectrum and so the signal supplied to the A/D converter 11 is compressed. This can compensate for the lack of the dynamic range of the converter 11. Consequently, it is unlikely that the signal-to-noise ratio is deteriorated by the A/D converter 11. Since equation (4b') is derived from equation (4a') in the same way as the deduction of equation (4b') from equation (4a'), description of the process of derivation is omitted.

Figure 19:
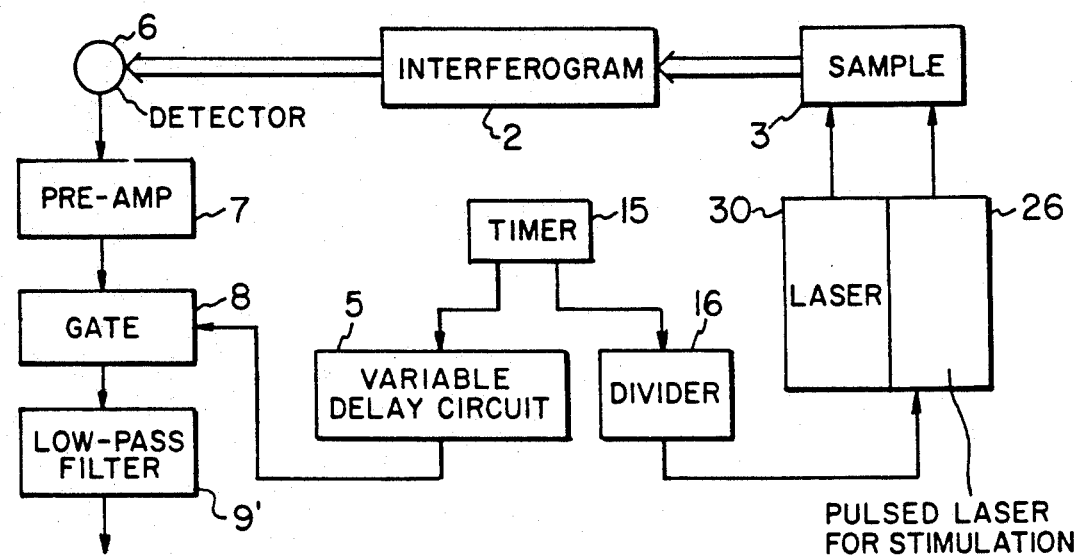
FIG. 19 is a block diagram of main portions of still another Raman spectrometer according to the invention.
Figure 20:
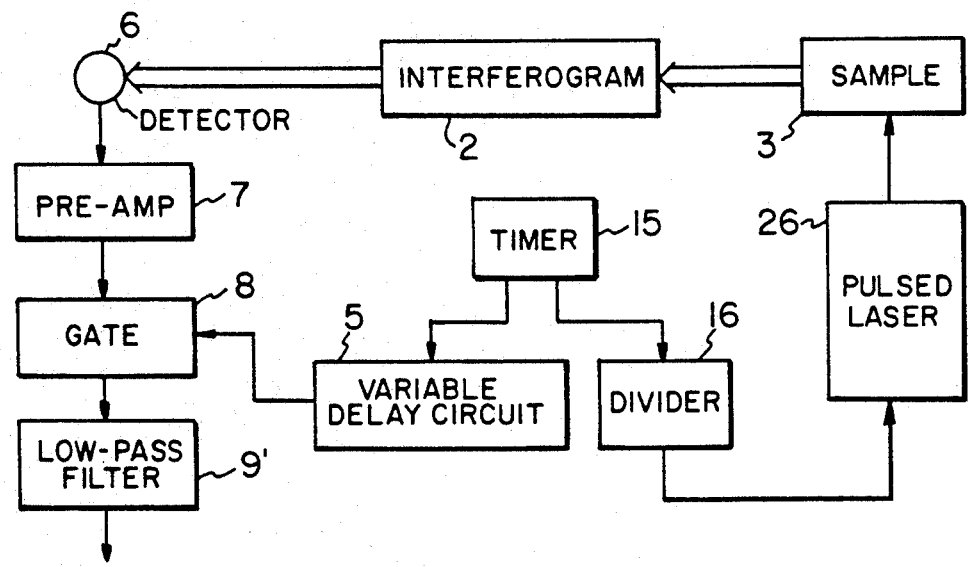
FIG. 20 is a block diagram of main portions of another fluorescence spectrophotometer according to the invention.

The method of the embodiment illustrated in FIG. 14 can be modified variously. For instance, the function of the gate circuit can be replaced by turning on and off the voltage supplied to the detector in synchronism with the trigger signal from the stimulus generator. Furthermore, the method can be applied to Raman spectroscopy and fluorescence spectrophotometry in which radiation from a pulsed laser is directed to a sample. Referring to FIG. 19, in the case of Raman spectroscopy, a continuously oscillating laser 30 for causing Raman effect and a pulsed laser 26 for stimulating the sample are employed, in the same way as in the embodiment of FIG. 6. The pulsed laser 26 for exciting the sample is operated in response to a signal produced at intervals half of the frequency of the clock pulses from the timer 15. The clock pulses from the timer 15 are delayed by $\Delta\tau$ by the variable delay circuit 5, and the gate circuit 8 is operated in response to the delayed pulses. Subsequently, the signal is processed in the same manner as in the embodiment of FIG. 14. Referring to FIG. 20, in the case of fluorescence spectrophotometry, a pulsed laser 26 which is operated at a frequency half of the frequency of the clock pulses from the timer 15 acts to give a stimulus to the sample, in the same way as in the structure shown in FIG. 14.

In the instruments shown in FIGS. 14, 19 and 20, a plurality of channels each including a gate circuit and a low-pass filter may be arranged in parallel. The differences between spectra obtained from a sample at different instants of time in the reaction process of the sample and a spectrum obtained in normal state can be derived simultaneously.

Figure 21:
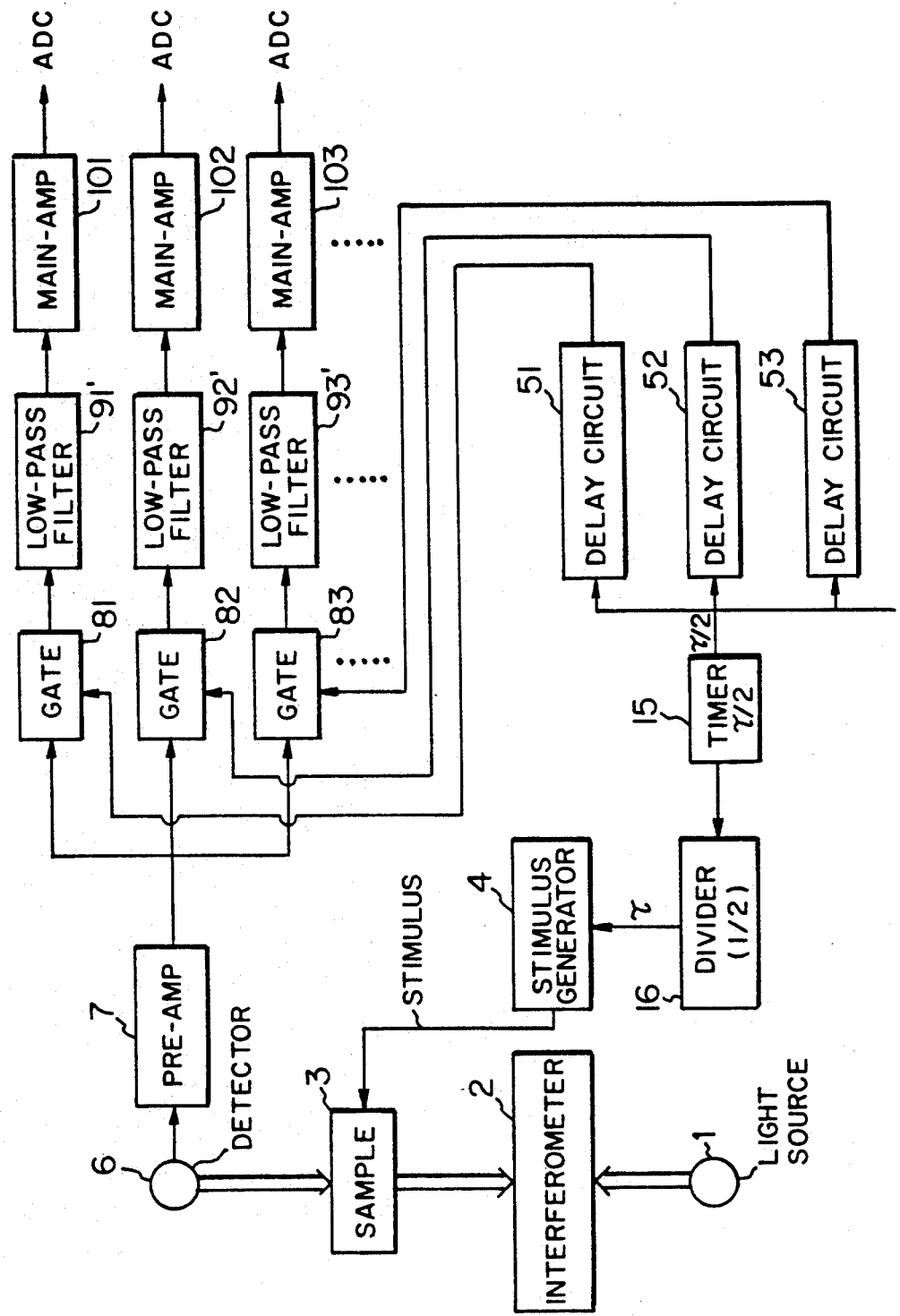
FIG. 21 is a block diagram of a further Fourier transform spectrometer having multiple channels, the spectrometer being built in accordance with the invention.

FIG. 21 shows an example of this multichannel instrument. This instrument is similar to the instrument shown in FIG. 7 except that a timer 15 and a frequency divider 16 are provided. Difference spectra representing various states of the sample 3 can be obtained with delay times $\Delta\tau 1$, $\Delta\tau 2$, $\Delta\tau 3$, etc. In consequence, the time required for the measurement can be shortened as compared with the times required in the methods illustrated in FIGS. 14, 19 and 20.

The method of the embodiment of FIG. 14 can also be applied to cases where a pulsed light source is used and a signal is produced by superimposing digital interferograms; In particular, the light source is made to emit light after delay $\Delta\tau$ with respect to each stimulation at intervals half the intervals at which the stimulus is repeatedly given. In the output signal from the detector, a digital interferogram representing a transient state and a digital interferogram representing normal state are superimposed with a phase difference of half of the interval, or the period.

Figure 22:
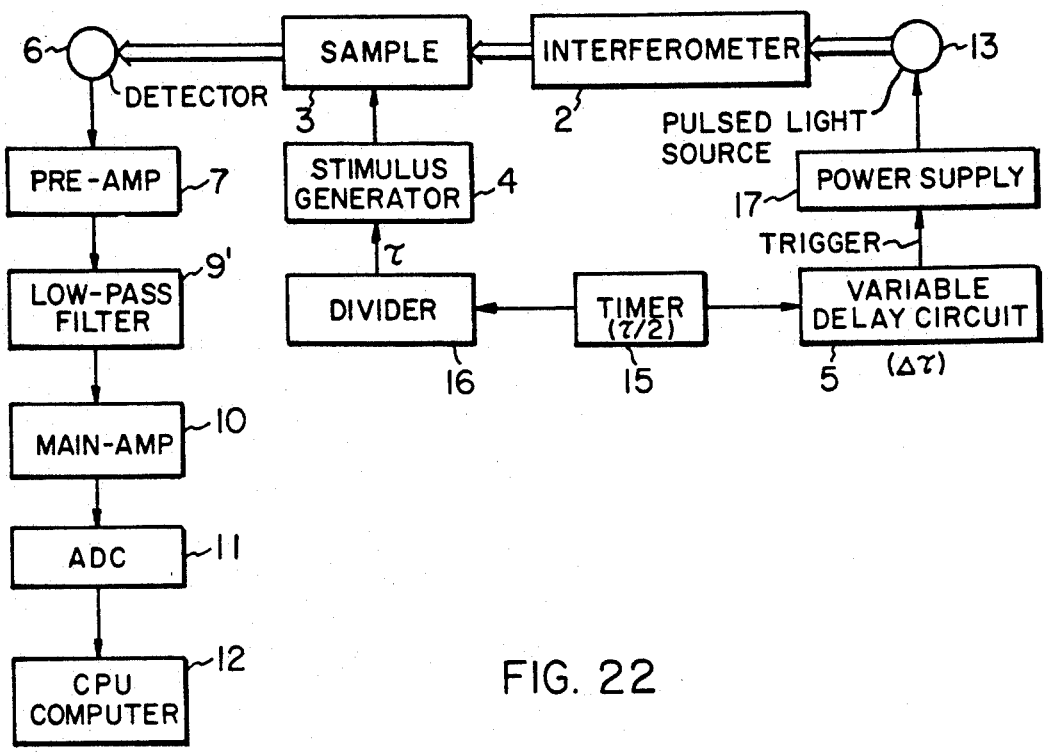
FIG. 22 is a block diagram of an additional Fourier transform spectrometer according to the invention.

The structure of an instrument of this structure is shown in FIG. 22. This instrument is similar to the instrument shown in FIG. 14 except that the gate circuit is removed and that a pulsed light source 13 and a power supply 17 for the light source are added. The trigger signal from the variable delay circuit 5 is supplied to the power supply 17. As a result, the pulsed light source 13 emits pulses of light with delays $\Delta\tau$ and $\Delta\tau/2+\Delta\tau$ since the sample 3 has been stimulated. Since the detector produces an output signal only while the light source is radiating, the gate circuit is dispensed with.

Figure 23:
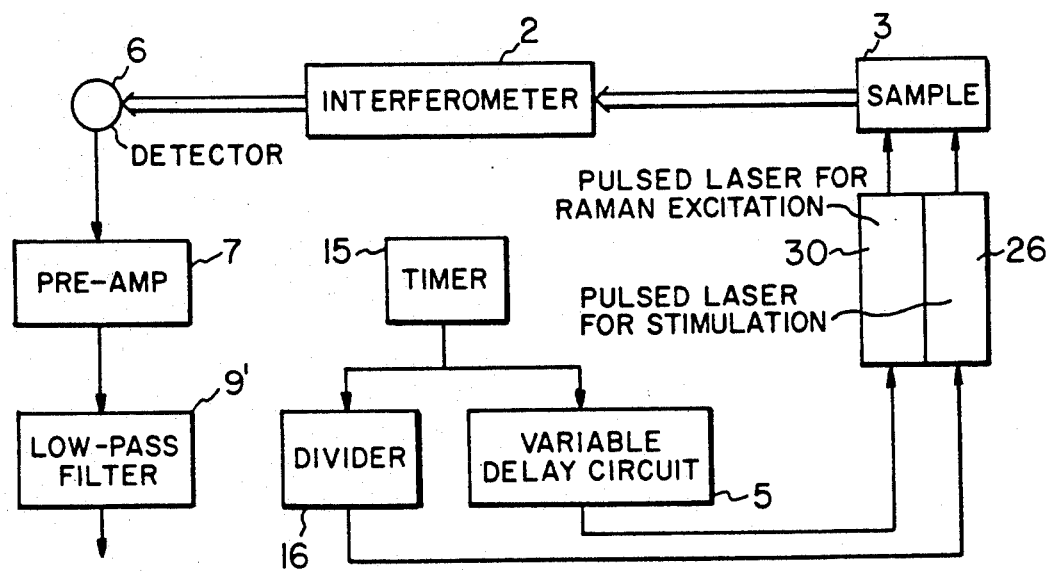
FIG. 23 is a block diagram of main portions of yet another Raman spectrometer according to the invention.

Referring next to FIG. 23, there is shown an instrument for carrying out time-resolved Fourier transform Raman spectroscopy. This instrument comprises a pulsed laser 30 causing Raman effect and a pulsed laser 28 for exciting or stimulating a sample. A frequency divider 16 produces a frequency half of the frequency of the clock pulses produced by a timer 15. The pulsed laser 26 for stimulating the sample is operated in response to the output signal from the frequency divider 16. The clock pulses from the timer 15 are also sent to a variable delay circuit 5 which delays its input signal by $\Delta\tau$. The pulsed laser 30 causing Raman effect is operated in response to the output signal from the delay circuit 5.

Figure 24:
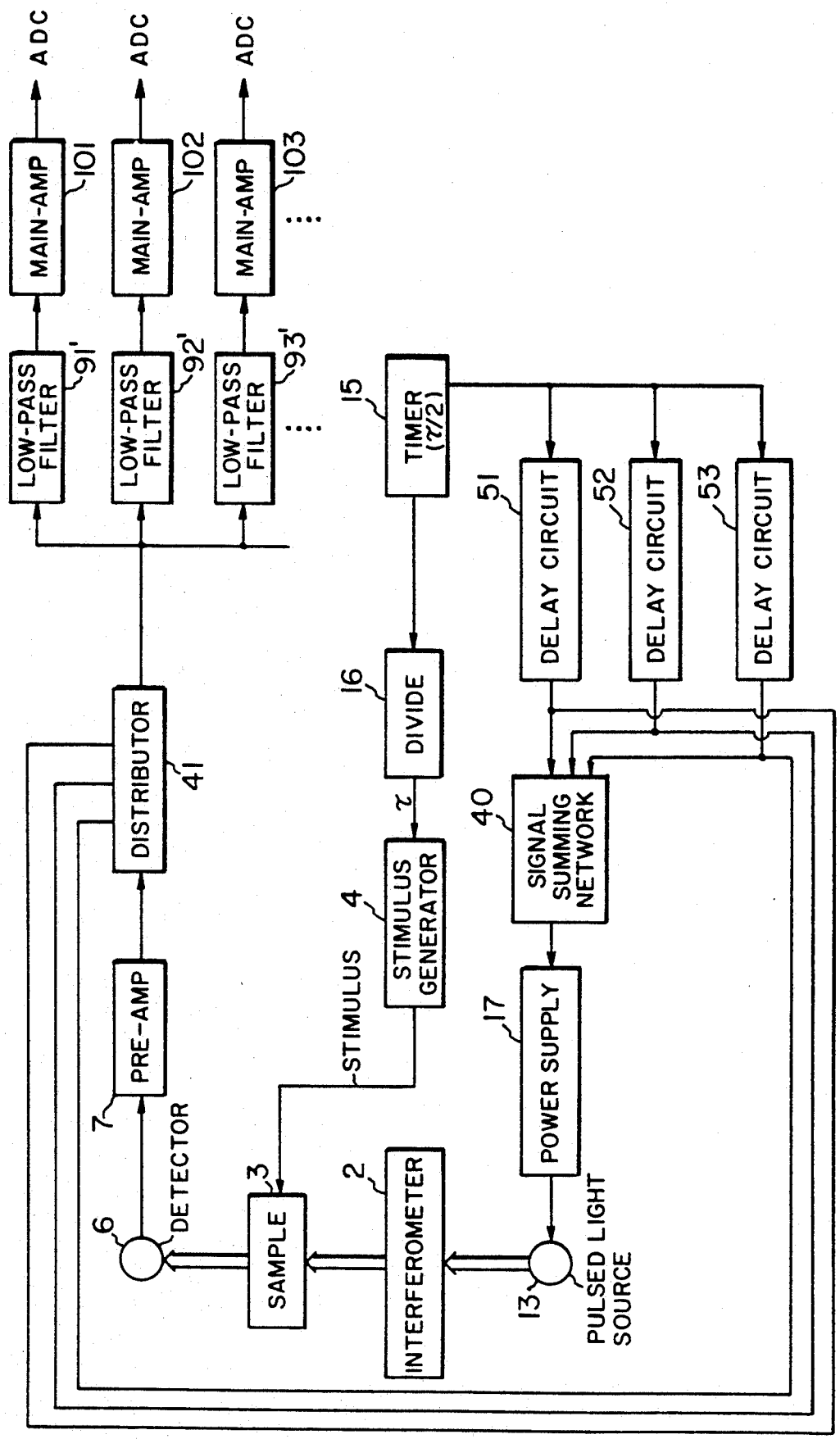
FIG. 24 is a block diagram of an additional Fourier transform spectrometer having multiple channels, the spectrometer being built in accordance with the invention.

In the instruments shown in FIGS. 22 and 23, only one channel consisting of a low-pass filter and other components is provided. It is also possible to provide plural such channels in parallel. Signals delayed by different times are distributed among the channels by a distributor. Consequently, spectra between spectra obtained from a sample at different instants of time and a spectrum obtained from the sample in normal state can be derived simultaneously in the reaction process of the sample, provided that the sample responds equally to every stimulus. FIG. 24 shows an instrument for carrying out this method. This instrument is similar to the instrument shown in FIG. 10 except that a timer 15 and a frequency divider 16 are provided. Difference spectra representing various states of the sample 3 are obtained simultaneously with delay times $\Delta\tau 1$, $\Delta\tau 2$, $\Delta\tau 3$, etc., in the same manner as in the embodiment of FIG. 10. Also in this case, therefore, the time required for the measurement can be shortened as compared with the times required in the embodiments shown in FIGS. 22 and 23.

Figure 25:
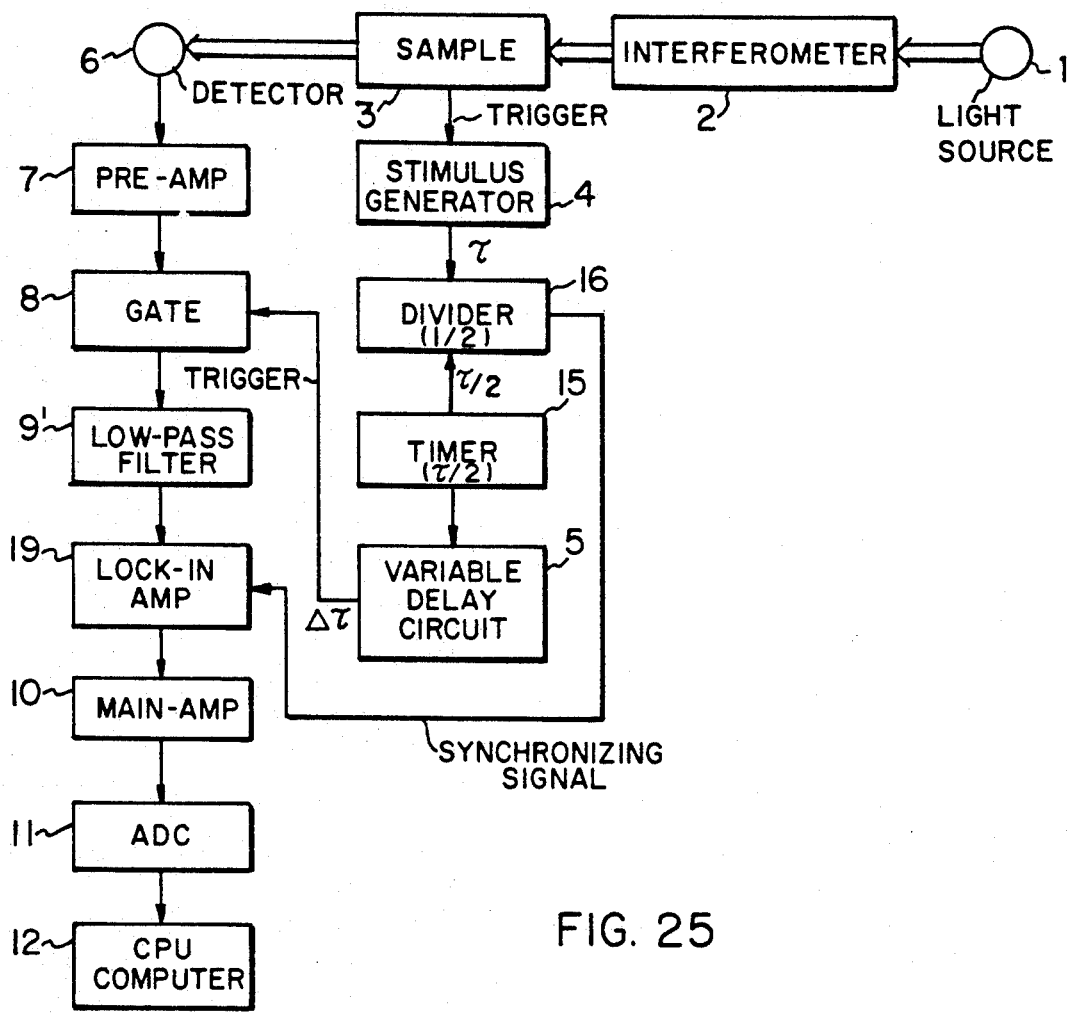
FIG. 25 is a block diagram of a still further Fourier transform spectrometer according to the invention.

Referring to FIG. 25, there is shown another embodiment of the invention to which the difference measurement method is applied. This instrument is similar to the instrument shown in FIG. 14 except that a lock-in amplifier 19 is inserted between the low-pass filter 9' and the main amplifier 10. A synchronizing signal produced at intervals of $\tau$ by the frequency divider 6 is supplied to the amplifier 19. Those components of the analog signal from the low-pass filter 11 which are synchronized to the synchronizing signal are amplified by the amplifier. As a result, the amplifier produces an interferogram corresponding to the difference between a transmittance spectrum obtained after the delay of $\Delta\tau$ and a transmittance spectrum obtained from the sample in normal state.

The principle on which measurements are made by the use of the instrument of this construction is now described. This instrument is similar to the instrument shown in FIG. 14 up to the stage immediately preceding lock-in amplifier. Therefore, equations (1)-(3), (3'), (4a'), (4b'), (15), (16), (16'), (17) and (17') hold similarly to the embodiment of FIG. 14.

Also in the present embodiment, an analog signal, i.e., a differential analog interferogram, corresponding to spectra associated with two terms of equations (16') and (17') is produced from the low-pass filter 9'. This signal is an interferogram given by $\int T_1(\nu, \Delta\tau)B(\sigma)\cos 2\pi x\sigma d\sigma$ and modulated at a frequency of $1/\tau$. Also in the case of FIG. 4, it is possible to pass only the odd-numbered spectra through the use of a band-pass filter. Generally, a filter passing spectra given by $n/2\tau < f < (n+1)/2\tau$ is used, where n is zero or a positive integer given by $n = m + 2k$ or $n = -(m+1) + 2k$, and k is an odd number, to extract spectra associated with odd order terms of equations (16') and (17'). At this time, the interferogram is modulated at a frequency $|k|$ times as high as $1/\tau$. Thus, the output signal from the low-pass filter is supplied to the lock-in amplifier 12 and amplified in synchronism with a reference signal having a frequency of $1/\tau$. The result is that the analog interferogram $F(x, \Delta\tau)$ between an interferogram representing the transient state of the sample assumed after the delay $\Delta\tau$ and an interferogram representing the sample in normal state can be derived. This interferogram is given by $$F(x, \Delta\tau) = \int T_1(\sigma, \Delta\tau) B(\sigma) \cos 2\pi x\sigma d\sigma \qquad (18)$$

This interferogram signal is supplied to the A/D converter 11 and sampled with a reference signal produced at intervals of $\tau_0$ for the interferometer 2, in the same manner as in conventional Fourier transform infrared spectroscopy. The resulting signal is fed to the CPU 12 and Fourier-transformed. As a result, a difference spectrum given by $T_1(\sigma, \Delta\tau)B(\sigma)$ is obtained. Let $f_{min}$ and $f_{max}$ be the minimum and the maximum, respectively, of the modulation frequency of the differential spectrum produced from the lock-in amplifier 19. It is necessary that the interval $\tau_0$ satisfy the conditions:

$$\tau_0 > m'/2f_{min} \text{ and } \tau_0 < (m'+1)/2f_{max}$$

where $m'$ is zero or a positive integer. As an example, the difference spectrum $T_1(\sigma, \Delta\tau)B(\sigma)$ between a transmittance spectrum $T(\sigma, \Delta\tau)B(\sigma)$ produced from the sample 3 in transient state after delay $\Delta\tau$ since the sample has been stimulated and a transmittance spectrum $T_0(\sigma)$ obtained from the sample in normal state is derived by taking the ratio of the difference spectrum $T_1(\sigma, \Delta\tau)B(\sigma)$ obtained by the novel method to $B(\sigma)$ that is found by conventional Fourier transform infrared spectroscopy. Likewise, a series of spectra is obtained with successively delayed times by adjusting the delay time of the variable delay circuit 5 to vary the delay time $\Delta\tau$ of the trigger signal to the gate circuit 8.

In this way, interferograms are processed in the form of a differential spectrum and so the signal supplied to the A/D converter 11 is compressed. This can compensate for the lack of the dynamic range of the converter 11. Consequently, it is unlikely that the signal-to-noise ratio is deteriorated by the A/D converter 11. The output signal from the low-pass filter 9' contains a phase component of a function of $\Delta t$ and so whenever the moving mirror of the interferometer is scanned, the analog signal takes a different form. However, this phase component can be eliminated by taking the product of this component and the reference signal of the frequency $1/\tau$ by means of the lock-in amplifier 19 such that the signal assumes the form of the difference between phases. Hence, the phase compensation made in the previous embodiment is rendered unnecessary. Also, the output signal from the lock-in amplifier 19 contains high-frequency components produced by folding back the difference spectrum at frequency $1/\tau$. These components can be prevented from adversely affecting the Fourier transform by appropriately selecting the sampling interval $\tau_0$. These high-frequency components may also be removed by inserting a filter between the lock-in amplifier 19 and the A/D converter 11.

Figure 26:
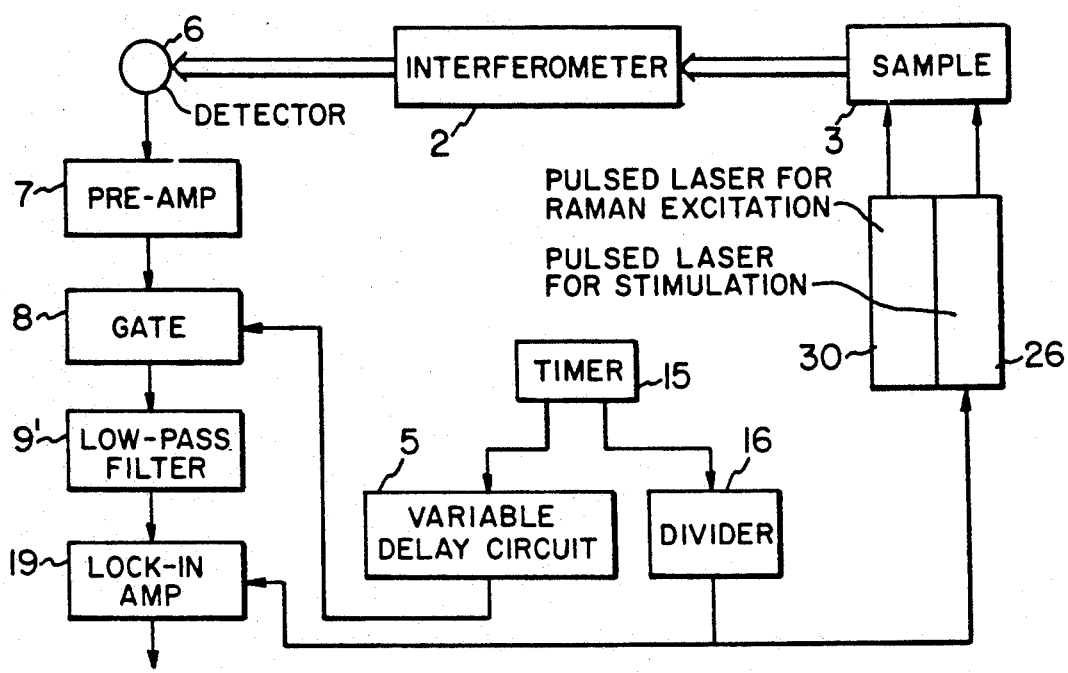
FIG. 26 is a block diagram of main portions of an additional Raman spectrometer according to the invention.

The present embodiment can be modified variously. For instance, the function of the gate circuit can be replaced by turning on and off the voltage supplied to the detector in synchronism with the trigger signal from the stimulus generator. Furthermore, the present method can be applied to Raman spectroscopy and fluorescence spectrophotometry in which radiation from a pulsed laser is directed to a sample. FIG. 26 shows an embodiment in which the method is applied to Raman spectroscopy. This configuration is similar to the embodiment of FIG. 19 except that a lock-in amplifier 19 is added.

Figure 27:
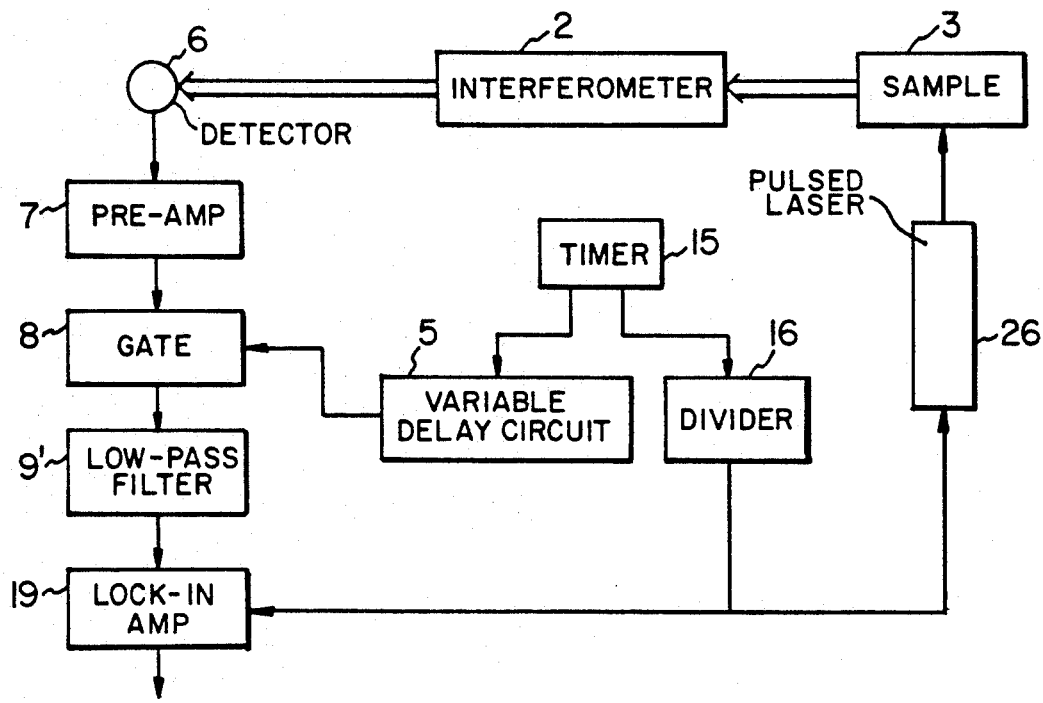
FIG. 27 is a block diagram of main portions of a further fluorescence spectrophotometer according to the invention.

FIG. 27 shows an embodiment in which the method is applied to fluorescence spectrophotometry. This embodiment is similar to the embodiment of FIG. 20 except that a lock-in amplifier 19 is added.

In the instruments shown in FIGS. 25, 26 and 27, only one channel consisting of a gate circuit, a low-pass filter, and other components is provided. It is also possible to provide plural such channels in parallel. Consequently, spectra between spectra obtained from a sample at different instants of time and a spectrum obtained from the sample in normal state can be derived simultaneously in the reaction process of the sample, provided that the sample responds equally to every stimulus.

Figure 28:
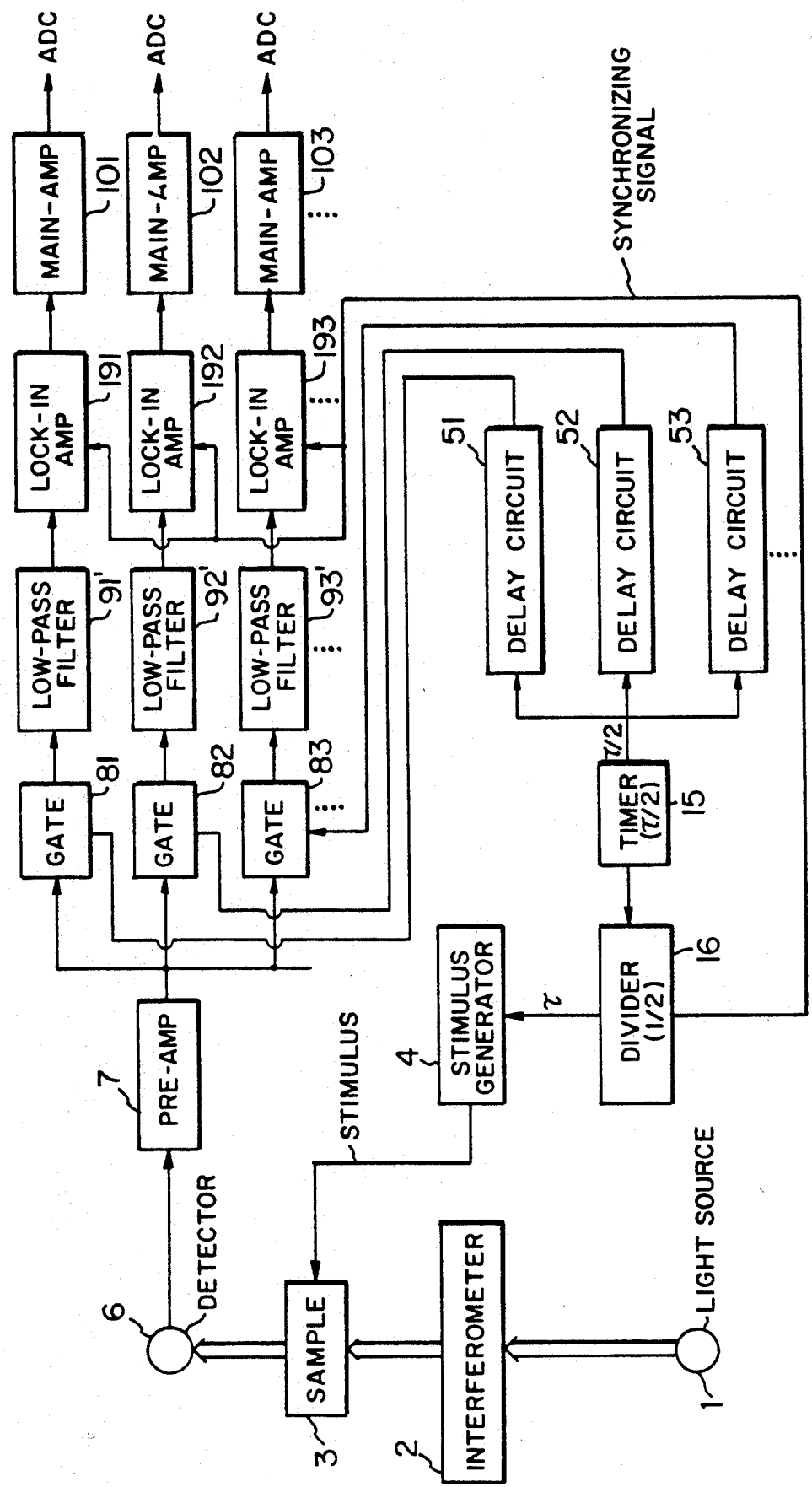
FIG. 28 is a block diagram of yet another Fourier transform spectrometer having multiple channels, the spectrometer being built in accordance with the invention.

FIG. 28 shows an instrument equipped with such plural channels. This instrument is similar to the instrument of FIG. 21 except that lock-in amplifiers 191, 192, 193 and so forth are added.

Figure 29:
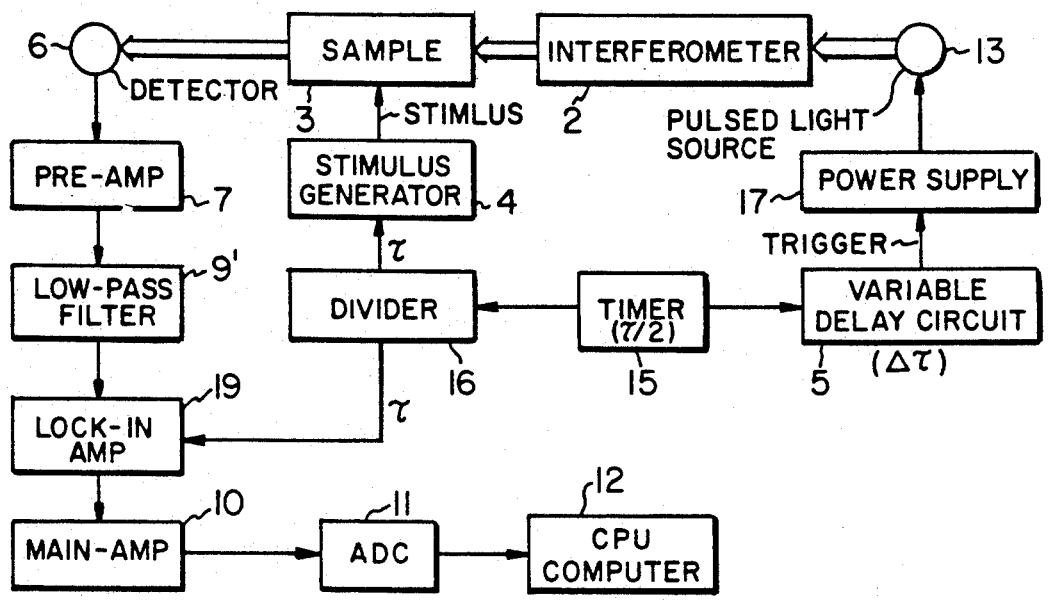
FIG. 29 is a block diagram of a yet further Fourier transform spectrometer according to the invention.

FIG. 29 shows an embodiment which is similar to the embodiment of FIG. 25 except that a pulsed light source 13 is used, thus dispensing with a gate circuit. This embodiment can also be regarded as the embodiment of FIG. 22 to which a lock-in amplifier 19 is added.

Figure 30:
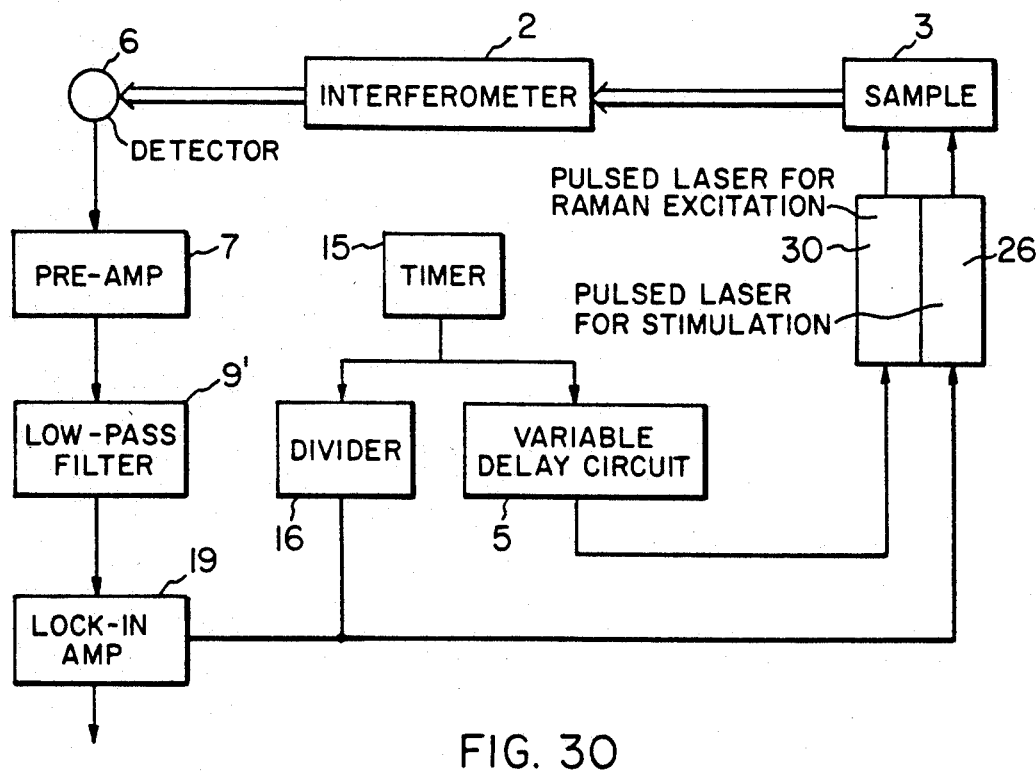
FIG. 30 is a block diagram of an additional Raman spectrometer according to the invention.

FIG. 30 shows an embodiment which is similar to the embodiment of FIG. 23 except that a lock-in amplifier 19 is added.

Figure 31:
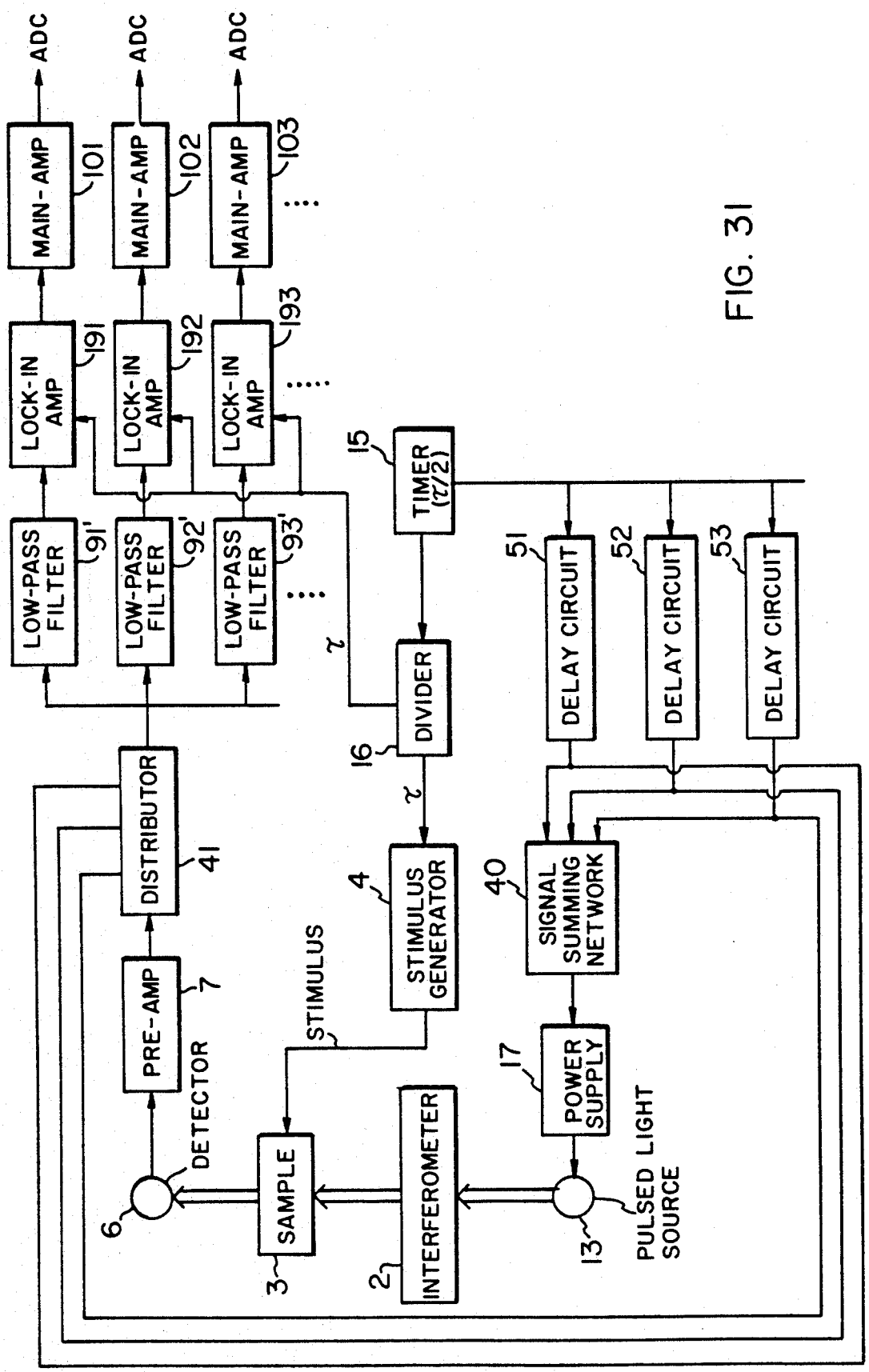
FIG. 31 is a block diagram of an additional Fourier transform spectrometer having multiple channels, the spectrometer being built in accordance with the invention.

In the instruments shown in FIGS. 29 and 30, only one channel consisting of a low-pass filter and other components is provided. It is also possible to provide plural such channels in parallel. Consequently, spectra between spectra obtained from a sample at different instants of time and a spectrum obtained from the sample in normal state can be derived simultaneously in the reaction process of the sample, provided that the sample responds equally to every stimulus. FIG. 31 shows an instrument for carrying out this method. This embodiment can be regarded as the embodiment of FIG. 24 to which lock-in amplifiers 191, 192, 193, etc. are added.

Having thus described my invention with the detail and particularity required by the Patent Laws, what is claimed and desired to be protected by Letters Patent is set forth in the following claims.

What is claimed is:

1. A Fourier transform spectroscopy comprising steps of:
    causing a stimulus generator to repeatedly give a stimulus to a sample under investigation at intervals of time longer than the duration of response of the sample to each stimulus;
    illuminating the sample with radiation via a rapid scan interferometer;
    detecting the radiation emanating from the sample by a detector;
    permitting passage of the output signal from the detector with a given delay with respect to each stimulation;
    extracting frequency components lying in the frequency range given by $$m/2\tau < f < (m+1)/2\tau$$

(where m is a positive integer, f is the frequency at which the radiation is modulated by the interferometer, and $1/\tau$ is the frequency of the stimuli) from the passed signal;
    sampling the extracted frequency components;
    obtaining an interferogram from the resulting samples; and
    Fourier-transforming the interferogram to obtain a spectrum representing the state of the sample assumed after the given delay time.

2. A Fourier transform spectroscopy comprising the steps of:

causing a stimulus generator to repeatedly give a stimulus to a sample under investigation at longer intervals of time than the duration of response of the sample;

directing radiation to the sample from a pulsed light source via a rapid scan interferometer with a given delay with respect to each stimulation at the same intervals as the intervals at which the stimulus is given;

detecting the radiation emanating from the sample by a detector;

extracting frequency components lying in the frequency range given by $$m/2\tau < f < (m+1)/2\tau$$

(where m is a positive integer, f is the frequency at which the radiation is modulated by the interferometer, and $1/\tau$ is the frequency of the stimuli) from the output signal from the detector;

sampling the extracted frequency components;

obtaining an interferogram from the resulting samples; and

Fourier-transforming the interferogram to obtain a spectrum representing the state of the sample assumed after the given delay time.

3. A Fourier transform spectroscopy comprising the steps of:

directing radiation to a sample under investigation from a pulsed light source via a rapid scan interferometer;

detecting the radiation emanating from the sample by a detector;

extracting frequency components lying in the frequency range given by $$m/2\tau < f < (m+1)/2\tau$$

(where m is a positive integer, f is the frequency at which the radiation is modulated by the interferometer, and $1/\tau$ is the frequency of the emission of the pulsed light source) from the output signal from the detector;

sampling the extracted frequency components;

obtaining an interferogram from the resulting samples;

Fourier-transforming the interferogram to obtain a spectrum of the radiation emanating from the sample under investigation.

4. A Fourier transform spectroscopy comprising the steps of:

periodically giving a stimulus to a sample under investigation responding equally to every stimulus at intervals at least twice as long as the intervals at which the sample responds;

directing radiation to the sample from a pulsed light source via a rapid scan interferometer with controlled delay with respect to each stimulation at intervals half the intervals at which the stimulus is repeatedly given;

detecting the radiation emanating from the sample by a detector;

permitting passage of the output signal from the detector with controlled delay with respect to each stimulation at intervals half the intervals at which the stimulus is given;

extracting frequency components lying in the frequency range given by $$n/2\tau < f < (n+1)/2\tau$$

(where n is zero or a positive integer given by $n = m + 2k$ or $n = -(m+1) + 2k$, m is a positive integer, k is an odd number, f is the frequency at which the radiation is modulated by the interferometer, and $1/\tau$ is the frequency at which the stimulus is repeatedly given) from the passed signal;

sampling the extracted frequency components;

phase compensating the resulting samples to obtain the difference interferogram between an interferogram obtained from the sample in excited state and an interferogram obtained from the sample in normal state; and Fourier-transforming the difference interferogram, thus producing the difference between a spectrum obtained from the sample with the controlled delay and a spectrum obtained from the sample in normal state.

5. A Fourier transform spectroscopy comprising the steps of:

periodically giving a stimulus to a sample under investigation responding equally to every stimulus;

causing a pulsed light source to emit radiation to the sample via a rapid scan interferometer with controlled delay with respect to each stimulation at intervals half the intervals at which the stimulus is given;

detecting the radiation emanating from the sample by a detector;

extracting frequency components lying in the frequency range given by $$n/2\tau < f < (n+1)/2\tau$$

(where n is zero or a positive integer given by $n = m + 2k$ or $n = -(m+1) + 2k$, m is a positive integer, k is an odd number, f is the frequency at which the radiation is modulated by the interferometer, and $1/\tau$ is the frequency at which the stimulus is repeatedly given) from the output signal from the detector;

sampling the extracted frequency components;

phase compensating the resulting samples to obtain the difference interferogram between an interferogram obtained from the sample in excited state and an interferogram obtained from the sample in normal state; and Fourier-transforming the difference interferogram, thus producing the difference between a spectrum obtained from the sample with the controlled delay and a spectrum obtained from the sample in normal state.

6. A Fourier transform spectroscopy comprising the steps of:

periodically giving a stimulus to a sample under investigation responding equally to every stimulus at intervals at least twice as long as the intervals at which the sample responds;

illuminating the sample with radiation via a rapid scan interferometer;

detecting the radiation emanating from the sample by a detector;

permitting passage of the output signal from the detector with controlled delay with respect to each stimulation at intervals half the intervals at which the stimulus is given;

extracting frequency components lying in the frequency range given by $$n/2\tau < f < (n+1)/2\tau$$

(where n is zero or a positive integer given by $n = m + 2k$ or $n = -(m+1) + 2k$, m is a positive integer, k is an odd number, f is the frequency at which the radiation is modulated by the interferometer, and $1/\tau$ is the frequency at which the stimulus is repeatedly given) from the passed signal;

sampling the extracted frequency components;

multiplying the resulting samples by a reference signal which is synchronized with the stimulus and has a frequency $|k|$ times as high as the repetition frequency of the stimulus to obtain the difference interferogram between an interferogram obtained from the sample in excited state and an interferogram obtained from the sample in normal state; and Fourier-transforming the difference interferogram, thus producing the difference between a spectrum obtained from the sample with the controlled delay and a spectrum obtained from the sample in normal state.

7. A Fourier transform spectroscopy comprising the steps of:

periodically giving a stimulus to a sample under investigation responding equally to every stimulus;

causing a pulsed light source to emit radiation to the sample via a rapid scan interferometer with controlled delay with respect to each stimulation at intervals half the intervals at which the stimulus is repeatedly given;

detecting the radiation emanating from the sample by a detector;

extracting frequency components lying in the range given by $$n/2\tau < f < (n+1)/2\tau$$

(where n is zero or a positive integer given by $n = m + 2k$ or $n = -(m+1) + 2k$, m is a positive integer, k is an odd number, f is the frequency at which the radiation modulated by the interferometer, and $1/\tau$ is the frequency at which the stimulus is repeatedly given) from the output signal from the detector;

sampling the extracted frequency components;

multiplying the resulting samples by a reference signal which is synchronized with the stimulus and has a frequency $|k|$ times as high as the repetition frequency of the stimulus to obtain the difference interferogram between an interferogram obtained from the sample in excited state and an interferogram obtained from the sample in normal state; and Fourier-transforming the difference interferogram, thus producing the difference between a spectrum obtained from the sample with the controlled delay and a spectrum obtained from the sample in normal state.

8. A Fourier transform spectrometer comprising:

a stimulus generator for repeatedly giving a stimulus to a sample under investigation at longer intervals than the duration of response of the sample, the repetition frequency of the stimulus being set to $1/\tau$;

a light source directing radiation to the sample via a rapid scan interferometer that modulates the radiation at frequency f;

a detector for detecting the radiation emanating from the sample;

a gating means permitting passage of the output signal from the detector with a given delay with respect to each stimulation;

a filtering means for extracting frequency components lying in the range given by $$m/2\tau < f < (m+1)/2\tau \text{ (m is a positive integer)}$$

from the passed signal to produce an interferogram;

a sampling means for sampling the interferogram;

a means for Fourier-transforming the resulting samples to obtain a spectrum.

9. A Fourier transform spectrometer comprising:

a stimulus generator for repeatedly giving a stimulus to a sample under investigation at longer intervals than the intervals at which the sample responds, the repetition frequency of the stimulus being set to $1/\tau$;

a pulsed light source for directing radiation to the sample via a rapid scan interferometer with a given delay with respect to each stimulation at the same intervals as the intervals at which the stimulus is given;

a detector for detecting the radiation emanating from the sample;

a filtering means for extracting frequency components lying in the range given by $$m/2\tau < f < (m+1)/2\tau \text{ (m is a positive integer)}$$

from the output signal from the detector to produce an interferogram; and a sampling means for sampling the extracted frequency components; and a means for Fourier-transforming the resulting samples to obtain a spectrum.

10. A Fourier transform spectrometer comprising:

a pulsed light source for periodically emitting radiation to a sample under investigation at frequency $1/\tau$ via a rapid scan interferometer that modulates the radiation at frequency f;

a detector for detecting the radiation emanating from the sample;

a filtering means for extracting frequency components lying in the range given by $$m/2\tau < f < (m+1)/2\tau \text{ (m is a positive integer)}$$

from the extracted frequency as to produce an interferogram;

a sampling means for sampling the interferogram; and a means for Fourier-transforming the resulting samples to obtain a spectrum of the measured light.

11. A Fourier transform spectrometer comprising:

a stimulus generator for repeatedly giving a stimulus to a sample under investigation at intervals at least twice as long as the intervals at which the sample responds, the sample responding equally to every stimulus, the repetition frequency of the stimulus being set to $1/\tau$;

a light source for illuminating the sample with radiation via a rapid scan interferometer that modulates the radiation at frequency f;

a detector for detecting the radiation emanating from the sample;

a gating means permitting passage of the output signal from the detector with controlled delay with respect to each stimulation at intervals half the intervals at which the stimulus is given;

a filtering means for extracting frequency components lying in the range given by $$n/2\tau < f < (n+1)/2\tau$$

(where n is zero or a positive integer given by n=m+2k or n=−(m+1)+2k, m is a positive integer, k is an odd number) from the passed signal to obtain an interferogram;

a sampling means for sampling the interferogram;

a means for phase compensating the resulting samples; and a means for Fourier-transforming the phase-compensated samples to obtain the difference between a spectrum obtained from the sample with the controlled delay and a spectrum obtained from the sample in normal state.

12. A Fourier transform spectrometer comprising:

a stimulus generator for repeatedly giving a stimulus to a sample under investigation at a frequency of $1/\tau$, the sample responding equally to every stimulus;

a pulsed light source for periodically emitting radiation to the sample via a rapid scan interferometer with controlled delay with respect to each stimulation at intervals half the intervals at which the stimulus is repeatedly given, the interferometer modulating the radiation at frequency f;

a detector for detecting the radiation emanating from the sample;

a filtering means for extracting frequency components lying in the range given by $$n/2\tau < f < (n+1)/2\tau$$

(where n is zero or a positive integer given by n=m+2k or n=−(m+1)+2k, m is a positive integer, k is an odd number) from the output signal from the detector to obtain an interferogram;

a sampling means for sampling the extracted frequency components;

a means for phase compensating the resulting samples; and a means for Fourier-transforming the phase-compensated samples to obtain the difference between a spectrum obtained from the sample with the controlled delay and a spectrum obtained from the sample in normal state.

13. A Fourier transform spectrometer comprising:

a stimulus generator for repeatedly giving a stimulus to a sample under investigation at a frequency of $1/\tau$ at intervals at least twice as long as the intervals at which the sample responds, the sample responding equally to every stimulus;

a light source for illuminating the sample with radiation via a rapid scan interferometer that modulates the radiation at frequency f;

a detector for detecting the radiation emanating from the sample;

a gating means permitting passage of the output signal from the detector with controlled delay with respect to each stimulation at intervals half the intervals at which the stimulus is given;

a means for extracting frequency components lying in the range given by $$n/2\tau < f < (n+1)/2\tau$$

(where n is zero or a positive integer given by n=m+2k or n=−(m+1)+2k, m is a positive integer, k is an odd number) from the passed signal to obtain an interferogram;

a means for sampling the extracted frequency components;

a multiplying means for multiplying the resulting samples by a reference signal which is synchronized with the stimulus and has a frequency |k| times as high as the repetition frequency of the stimulus; and a means for Fourier-transforming the output signal from the multiplying means to obtain a spectrum.

14. The Fourier transform spectrometer of claim 13, wherein said multiplying means is a lock-in amplifier.

15. A Fourier transform spectrometer comprising:

a stimulus generator for repeatedly giving a stimulus to a sample under investigation at a repetition frequency of $1/\tau$, the sample responding equally to every stimulus;

a pulsed light source for periodically emitting radiation to the sample via a rapid scan interferometer with controlled delay with respect to each stimulation at intervals twice as short as the intervals at which the stimulus is repeatedly given, the interferometer modulating the radiation at frequency f;

a detector for detecting the radiation emanating from the sample;

a filtering means for extracting frequency components lying in the range given by $$n/2\tau < f < (n+1)/2\tau$$

(where n is zero or a positive integer given by n=m+2k or n=−(m+1)+2k, m is a positive integer, k is an odd number) from the output signal from the detector to obtain an interferogram;

a sampling means for sampling the extracted frequency components;

a multiplying means for multiplying the resulting samples by a reference signal which is synchronized with the stimulus and has a frequency |k| times as high as the repetition frequency of the stimulus; and a means for Fourier-transforming the output signal from the multiplying means to obtain a spectrum.

16. The Fourier transform spectrometer of claim 15, wherein said multiplying means is a lock-in amplifier.

* * * * *

UNITED STATES PATENT AND TRADEMARK OFFICE
CERTIFICATE OF CORRECTION

PATENT NO. : 5,251,008

DATED : October 5, 1993

INVENTOR(S) : Koji Masutani

It is certified that error appears in the above-indentified patent and that said Letters Patent is hereby corrected as shown below:

Column 3 Line 26 "oFIG." should read --FIG.--.

Column 4 Line 40 after "source" insert --1,--.

Column 6 Line 25 "III$_\sigma$(t)" should read --III$_\tau$(t)--.

Column 6 Line 31 Eq. (3) "Fo(x)=" should read --Fo(x)+--.

Column 6 Line 32 Eq. (3) "2$_\tau$X" should read --2$\pi$X--.

Column 6 Line 34 Eq. (3') "FO(x)" should read --Fo(x)--.

Column 6 Line 34 Eq. (3') "2$_\tau$x" should read --2$\pi$x--.

Column 6 Line 67 Eq. (4a) "F(x, t)" should read --F'(x, t)--.

Column 7 Line 35 "i2$_\tau$" should read --i2$\pi$--.

Column 7 Line 39 "(f)" should read --$\delta$(f)--.

Column 7 Line 58 Eq. (6) "2$_\tau$x" should read --2$\pi$x--.

Column 8 Line 9 ",o" should read --$\tau$o--.

Column 8 Lines 43-45 Eq. (4a) "F,(x, t)" should read --F'(x, t)-- and be made part of Eq. (4a).

UNITED STATES PATENT AND TRADEMARK OFFICE
CERTIFICATE OF CORRECTION

PATENT NO. : 5,251,008
DATED : October 5, 1993
INVENTOR(S) : Koji Masutani

It is certified that error appears in the above-indentified patent and that said Letters Patent is hereby corrected as shown below:

Column 8 Line 46 Eq. (4a) "$2\tau x$" should read --$2\pi x$--.

Column 9 Line 23 "$F,(x, t)$" should read --$F'(x, t)$--.

Column 9 Line 25 Eq. (4b) "$F(x, t)$" should read --$F'(x, t)$--.

Column 9 Line 25 Eq. (4b) "$2\tau x$" should read --$2\pi x$--.

Column 9 Line 49 "sample $\Delta\tau$" should read --sample 3--.

Column 12 Line 22 after "converter" insert --11--.

Column 12 Line 62 Eq. (11) "$2\tau x$" should read --$2\pi x$--.

Column 13 Line 28 Eq. (12) "$(-2\tau ft')$" should read --$(-2\pi ft')$--.

Column 13 Line 28 Eq. (12) "$(-2\tau$" should read --$(-2\pi$--.

Column 13 Line 30 Eq. (12') "$\{-i2\tau$" should read --$\{-i2\pi$--.

Column 13 Line 30 Eq. (12') "++" should read --+....+--.

UNITED STATES PATENT AND TRADEMARK OFFICE
CERTIFICATE OF CORRECTION

PATENT NO. : 5,251,008
DATED : October 5, 1993
INVENTOR(S) : Koji Masutani

It is certified that error appears in the above-indentified patent and that said Letters Patent is hereby corrected as shown below:

Column 13 Line 31 Eq. (12') "(i2r" should read --(i2$\pi$--.

Column 13 Line 31 Eq. (12') "+}" should read --+....}--.

Column 13 Lines 51-52 "super-imposed imposed" should read --super-imposed--.

Column 13 Line 67 Eq. (13) "2rx" should read --2$\pi$x--.

Column 14 Line 16 ",o" should read --ro--.

Column 16 Line 34 after "state" insert --.--.

Column 16 Line 39 Eq. (4a') "$F_1$(x, t)" should read --$F'_1$(x, t)--.

Column 16 Line 46 Eq. (15) "$F_2$(x, t)" should read --$F'_2$(x, t)--.

Column 17 Line 20 "$\Delta$r)/r." should read --$\Delta$t)/r.--.

Column 18 Line 4 "9," should read --9'.--.

UNITED STATES PATENT AND TRADEMARK OFFICE
CERTIFICATE OF CORRECTION

PATENT NO. : 5,251,008
DATED : October 5, 1993
INVENTOR(S) : Koji Masutani

It is certified that error appears in the above-indentified patent and that said Letters Patent is hereby corrected as shown below:

Column 18 Line 4 ",o" should read --$r$o--.

Column 18 Line 9 "m," should read --m'--.

Column 18 Line 19 "$\nu$}" should read --$\sigma$ }--.

Column 19 Line 35 "interferograms;" should read --interferograms.--.

Column 20 Line 47 "($\nu$," should read --($\sigma$,--.

Claim 1 Line 41 Column 22 after "comprising" insert --the--.

Claim 2 Line 17 Column 23 "m/296" should read --m/2$r$--.

Claim 7 Line 46 Column 25 after "radiation" insert --is--.

Signed and Sealed this

Twelfth Day of April, 1994

Attest:

BRUCE LEHMAN

*Attesting Officer*   *Commissioner of Patents and Trademarks*